(12) United States Patent
Bender et al.

(10) Patent No.: US 10,745,778 B2
(45) Date of Patent: Aug. 18, 2020

(54) LEACHING AIDS AND METHODS OF USING LEACHING AIDS

(71) Applicant: BASF SE, Ludwigshafen (DE)

(72) Inventors: Jack Thomas Bender, Vail, AZ (US); Nathan Clark Emmerich, Tucson, AZ (US); Russell Vincent Brewer, Vail, AZ (US); Lauren Michele Hight, Tucson, AZ (US)

(73) Assignee: BASF SE, Ludwigshafen (DE)

( * ) Notice: Subject to any disclaimer, the term of this patent is extended or adjusted under 35 U.S.C. 154(b) by 491 days.

(21) Appl. No.: 15/349,532

(22) Filed: Nov. 11, 2016

(65) Prior Publication Data
US 2017/0159153 A1 Jun. 8, 2017

Related U.S. Application Data

(60) Provisional application No. 62/264,014, filed on Dec. 7, 2015.

(51) Int. Cl.
C22B 15/00 (2006.01)
C22B 3/08 (2006.01)
C22B 3/16 (2006.01)
C25C 1/12 (2006.01)
C22B 3/20 (2006.01)
C22B 3/00 (2006.01)
C22B 3/18 (2006.01)

(52) U.S. Cl.
CPC ........ *C22B 15/0071* (2013.01); *C22B 3/0004* (2013.01); *C22B 3/08* (2013.01); *C22B 3/1641* (2013.01); *C22B 3/18* (2013.01); *C22B 11/04* (2013.01); *C25C 1/12* (2013.01); *Y02P 10/234* (2015.11); *Y02P 10/236* (2015.11)

(58) Field of Classification Search
CPC ....... C22B 15/0067; C22B 3/08; C22B 3/004; C22B 11/04
USPC .................................. 252/79.1; 423/20, 23
See application file for complete search history.

(56) References Cited

U.S. PATENT DOCUMENTS

| | | |
|---|---|---|
| 3,266,889 A | 8/1966 | Duncan et al. |
| 4,875,935 A | 10/1989 | Gross et al. |
| 5,112,582 A | 5/1992 | Polizzotti |
| 5,186,915 A | 2/1993 | Polizzotti |
| 5,368,745 A | 11/1994 | Rothenberg et al. |
| 5,472,675 A | 12/1995 | Polizzotti et al. |
| 5,668,219 A | 9/1997 | Polizzotti et al. |

(Continued)

FOREIGN PATENT DOCUMENTS

| | | |
|---|---|---|
| WO | 97/23281 | 7/1997 |
| WO | 2014/194268 | 12/2014 |

OTHER PUBLICATIONS

Wikipedia, "Parts-per notation" via https://en.wikipedia.org/wiki/Parts-per_notation ; pp. 1-8; 2019.*

(Continued)

*Primary Examiner* — Binh X Tran
(74) *Attorney, Agent, or Firm* — Lowenstein Sandler LLP

(57) ABSTRACT

Leaching aids, for example, when present in a leaching solution, and methods of using the leaching aids. The leaching aids can include one or a combination of compounds. The method of using the leaching aids can include a process of recovering metal from ore, for example, a process involving heap leaching, solvent extraction and electrowinning.

26 Claims, 11 Drawing Sheets

(56) References Cited

U.S. PATENT DOCUMENTS

| | | |
|---|---|---|
| 5,833,937 A | 11/1998 | Kerr |
| 6,312,500 B1 | 11/2001 | Duyvesteyn et al. |
| 6,409,799 B1 | 6/2002 | Cifuentes et al. |
| 6,833,479 B2 * | 12/2004 | Witschger ............. C07C 217/28 205/585 |
| 7,862,785 B2 | 1/2011 | Seelmann-Eggebert et al. |
| 8,287,616 B2 | 10/2012 | Seelmann-Eggebert et al. |
| 8,343,326 B2 | 1/2013 | Virnig et al. |
| 8,440,857 B2 | 5/2013 | Virnig et al. |
| 9,074,292 B2 | 7/2015 | Virnig et al. |
| 2003/0192403 A1 | 10/2003 | Burgmayer |
| 2008/0025890 A1 | 1/2008 | Seelmann-Eggebert et al. |
| 2008/0264799 A1 | 10/2008 | Seelmann-Eggebert et al. |
| 2009/0078087 A1 | 3/2009 | Heidenfelder et al. |
| 2011/0217222 A1 | 9/2011 | Heidenfelder et al. |
| 2013/0056357 A1 | 3/2013 | Virnig et al. |
| 2016/0264792 A1 * | 9/2016 | Jauzein .................... B41M 3/14 |

OTHER PUBLICATIONS

Wikipedia, "Hydroxy group" via https://en.wikipedia.org/wiki/Hydroxy_group ; pp. 1-2;; 2019.*
PubChem Substance Summary for CID 75844 Deposit , Dec. 4, 2001, pp. 1-14.
International Search Report for PCT/US16/61591 dated Mar. 24, 2017, 10 pgs.
European Search Report for International Application No. 16873550.4 dated Jul. 2, 2019, 12 pgs.
Wikipedia, "Parts-per notion," via https://en.wikipedia.org/wiki/Parts-per_notion; 2019, pp. 1-8.
Wikipedia, "Hydroxy group," https://en.wikipedia.org/wiki/Hydroxy_group, 2019, pp. 1-2.

* cited by examiner

LEACHING AIDS AND METHODS OF USING LEACHING AIDS

FIELD

The disclosure relates generally to the field of extractive metallurgy. In particular, the disclosure relates to leaching aids, for example, when present in a leaching solution, and methods of using the leaching aids. In certain example aspects, the leaching aids can include one or a combination of components. The method of using the leaching aids can include a process of recovering metal from ore, for example, a process involving heap leaching, solvent extraction and electrowinning.

BACKGROUND

Copper, copper alloys and several other valuable metals have been in use for thousands of years. Because of the importance of such metals, numerous entities have and continue to research ways to increase the efficiency and productivity of procurement methods. It is critical for mines to maximize efficiency when extracting metals from ore. Copper-containing ores are typically classified into two categories—oxidic and sulfidic ores. Oxidic ores (e.g., cuprite, malachite, and azurite) are found near the surface as they are oxidation products of the deeper secondary and primary sulfidic ores (e.g., chalcopyrite, bornite, and chalcocite). Due to the chemical nature of copper oxides and secondary sulfides, mines typically treat the ore with hydrometallurgical processes—i.e., heap leaching, solvent extraction, and electrowinning. Approximately 20% of the world's annual copper production is obtained through hydrometallurgical processes.

During hydrometallurgical processes, metal is extracted when the metal-containing material is leached in one of several ways. Leaching is typically accomplished by applying a lixiviant to a collection of ore. The most common lixiviant used in the mining industry is sulfuric acid ("$H_2SO_4$") because it provides efficient and cost effective liberation of the metal from the ore. The leaching process can be a heap, dump, percolation or agitation leaching process. However, despite the leaching method, the intrinsic principles of leaching are the same: "1. [The process] . . . must dissolve the ore minerals rapidly enough to make commercial extraction possible[.] . . . [The process] should show chemical inertness toward gangue minerals . . . [because] [i]n situations where gangue minerals are attacked, an excessive amount of the lixiviant is consumed and the leach liquor fouled with impurities to an undesirable extent. 2. [The process] . . . must be cheap and readily obtainable in large quantities. 3. If possible, . . . [the process] should be such that it can be regenerated in the subsequent processes following leaching." C. K. Gupta, T. K. Mukherjee, Hydrometallurgy in Extraction Processes, vol. 1. The underpinning characteristic of leaching is that regardless of the lixiviant used, it must be able to interact with the ore particles in a way that allows for transfer of the desired metal from the ore into a collected and then managed solution.

Heap leaching is a common method of leaching in hydrometallurgical processes; however, this method has disadvantages. When metal-containing material is piled into a heap and sprayed with a solution of dilute acid, significant time is required for the solution to percolate down through the heap before it can be collected and supplied to subsequent operations. The extraction process can require several days to months. Further issues arise when the fine particles in the heap accumulate between larger pieces of ore and decrease the speed of downward flow of the leaching solution or block the flow altogether. This results in channeling of the leachate (i.e., where the solution follows the path of least resistance through the heap), less contact with the packed fines, and a lower than expected concentration of metal in the resulting pregnant leaching solution ("PLS"). These accumulations can also lead to pooling of the metal-containing solution and ultimately a decrease in leaching yield as the valuable metal remains trapped in the heap.

To combat these issues, the ore can be agglomerated before applying the leaching solution. For example, agglomerating agents can be incorporated into the leaching solution and/or raffinate. Agglomerating agents function as binding agents for the smaller fines to the larger ore particles. This binding allows for more uniform percolation of the leaching solution through the heap. Such agglomerating agents can include strong acid and water combinations, anionic acrylamides, copolymers of acrylamide and acrylic acid, hydroxamated polymers, polyvinyl alcohols, ammonium cation and acrylamide-derived copolymers, and copolymers including combinations of poly(acrylamide), poly(acrylamide/sodium acrylate), poly(diallyldimethylammonium chloride), poly (acrylamide/diallyldimethylammonium chloride) and poly (diallyldimethylammonium chloride/vinyltrimethoxysilane) groups.

One drawback to the use of agglomerating agents is their limited ability to withstand acidic conditions, for example, from a sulfuric acid leaching solution. Breakdown of the agglomerating agents results in subsequent breakdown of the agglomerated particles. This quickly leads to the same issues as previously described, such as channeling and pooling within the heap. Channeling and pooling long have been a problem in heap leaching, and many have attempted to address such issues by introducing, for example, an antifoam, surfactant, or acid digestion agents. However, the mining industry has not widely adopted, for example, organic polymer type agglomeration agents for heap leaching because of their incompatibility with processes (e.g., solvent extraction, electrowinning) downstream from the leaching operation and added cost.

There remains a need for leaching aids, particularly in leaching solutions, and methods of using the leaching aids in a process for recovering metal from ore. According to various example aspects, the leaching aids are compatible in all aspects of a process including heap leaching, solvent extraction and electrowinning.

BRIEF SUMMARY

According to various example aspects, the leaching solution can include a lixiviant; and one or more compound having formula (I):

$$R((AO)_nB)_m((AO)_nH)_p \qquad (I)$$

wherein each AO group is, independently, an alkyleneoxy group selected from ethyleneoxy ("EO"), 1,2-propyleneoxy ("PO"), 1,2-butyleneoxy, and styryleneoxy; n is an integer from 0 to 40; m is an integer from 1 to the total number of OH hydrogens in the R group prior to alkoxylation; p is an integer such that the sum of m plus p equals the number of OH hydrogens in the R group prior to alkoxylation; B is H, $SO_3Y$, $(CH_2)_qSO_3Y$, $CH_2CHOHCH_2SO_3Y$, or $CH_2CH(CH_3)OSO_3Y$, wherein q is an integer from 2 to 4, and Y is a cation; R is a group selected from formula (II) to (VIII):

$R_1C(CH_2O)_3$ (II)

wherein $R_1$ is H, methyl, ethyl, or propyl;

$C(CH_2O)_4$ (III);

$OC(CH_2O)_2$ (IV);

$N(CH_2CH_2O)_3$ (V);

$(R_2)_xN(CH_2CH_2O)_y$ (VI)

wherein $R_2$ is a $C_1$-$C_4$ alkyl, y is 1-3 and x+y=3;

$O(CH_2)_rO$ (VII), wherein r is 2 to 6; and $O(CH(CH_3)CH_2)O$ (VIII);

wherein the compound is at a total concentration of about 1 ppm to about 2000 ppm or about 5 to about 100 ppm, or about 5 ppm to about 50 ppm, or about 15 ppm to about 30 ppm, or about 25 ppm. In formula (I) n can be 2 to 30, or 2 to 20, or 2 to 10. The compound can include the following structure:

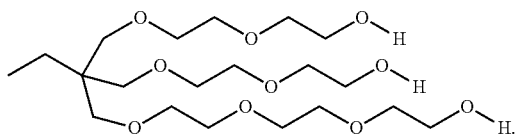

The lixiviant can be sulfuric acid, ammonia, or a mixture of ammonia and an ammonium salt (e.g., ammonium carbonate or ammonium sulfate) and the lixiviant can be at a concentration of, for example, about 1 g/L to about 50 g/L, about 1 g/L to about 25 g/L, about 1 g/L to about 15 g/L, about 1 g/L to about 10 g/L, about 5 g/L to about 25 g/L. In certain aspects, the lixiviant can be at a concentration of about 10 g/L, or about 5 g/L to about 100 g/L, or about 5 g/L to about 50 g/L, or about 5 g/L to about 15 g/L of the leaching solution. The compound can be at a total concentration of about 10 ppm to about 1000 ppm, or about 20 ppm to about 500 ppm or about 25 ppm to about 50 ppm, or about 5 ppm to about 50 ppm, or about 5 ppm to about 100 ppm of the leaching solution. Y can be a hydrogen, sodium, potassium or ammonium ion. The leaching solution can further include a metal selected from a group consisting of copper, gold, silver, nickel, zinc, molybdenum, vanadium, uranium, and combinations thereof. In certain aspects, the lixiviant can be an alkaline cyanide solution where the ore is a gold and/or silver containing ore.

In other example aspects, the leaching solution, can include a lixiviant; and one or more compound having formula (IX):

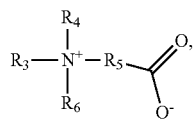 (IX)

wherein $R_3$ is a $C_1$ to $C_{20}$ linear or branched alkyl group comprising zero or more substitutions with any of O, N, OH or

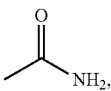

$R_4$ and $R_6$ are each, independently, H, a $C_1$ to $C_{10}$ linear or branched alkyl group or an alcohol group, $R_5$ is a $C_1$ to $C_{10}$ linear or branched alkyl group; and wherein the compound is at a concentration of about 1 ppm to about 2000. In certain aspects, $R_3$ can be a $C_{10}$ linear or branched alkyl group, $R_4$ and $R_6$ can be each, independently, a $C_1$ to $C_4$ alkyl group and/or $R_5$ can be a $C_1$ to $C_4$ alkyl group. The compound can have the structure:

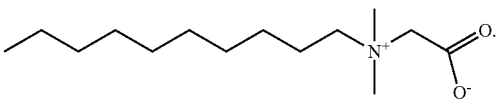 [SMILES: CCCCCCCCCC[N+](C)(C)CC(=O)[O-]]

In certain aspects, $R_3$ can have at least one

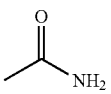

substitution and/or $R_4$ and $R_6$ are each, independently, H or an alcohol group. The compound can have the structure:

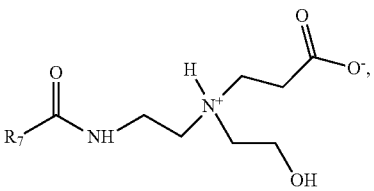

wherein $R_7$ is a $C_1$ to $C_{20}$ linear or branched alkyl group comprising zero or more substitutions with any of O, N, OH or

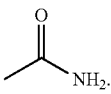

In certain example aspects, the lixiviant in the leaching solution can be sulfuric acid or ammonia. The lixiviant can be sulfuric acid at a concentration of, for example, about 1 g/L to about 50 g/L, about 1 g/L to about 25 g/L, about 1 g/L to about 15 g/L, about 1 g/L to about 10 g/L, about 5 g/L to about 25 g/L. In certain aspects, the lixiviant can be at a concentration of about 10 g/L, or about 5 g/L to about 100 g/L, or about 5 g/L to about 50 g/L, or about 5 g/L to about 15 g/L of the leaching solution. The compound can be at a total concentration of about 10 ppm to about 1000 ppm, or about 20 ppm to about 500 ppm, or about 25 ppm to about 50 ppm, or about 5 ppm to about 50 ppm, or about 5 ppm to about 100 ppm, or about 15 ppm to about 30 ppm or about 25 ppm. The leaching solution can further include a metal selected from a group consisting of copper, gold, silver, nickel, zinc, molybdenum, vanadium, uranium, and combinations thereof.

In yet further example aspects, the leaching solution can include a lixiviant; and one or more compound having a formula (X), (XI), (XII) or (XIII) as follows:

1) an alkyl or alkyl ether sulfate having formula (X) or (XI):

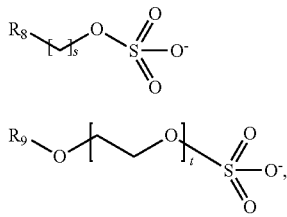
(X)

(XI)

wherein s and t are each, independently, an integer from 0 to 10 and $R_8$ and $R_9$ are each, independently, a $C_1$ to $C_{20}$ linear or branched alkyl group, 2) a sulfonate having formula (XII):

(XII), wherein $R_{10}$ and $R_{11}$ are each, independently, a $C_1$ to $C_6$ linear or branched alkyl group, 3) an acetylenic diol having formula (XIII):

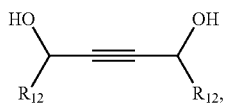
(XIII)

wherein $R_{12}$ is a $C_1$ to $C_6$ linear or branched alkyl group, and 4) an amphoacetate having formula (XIV):

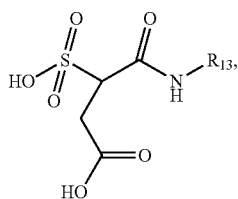
(XIV)

wherein $R_{13}$ is a $C_2$ to $C_{20}$ linear or branched alkyl group; and wherein the one or more compound is at a total concentration of about 1 ppm to about 2000 ppm. In certain example aspects, t can be 1 to 5 and/or $R_9$ can be a $C_1$ to $C_8$ linear or branched alkyl group. The compound can have the following structure:

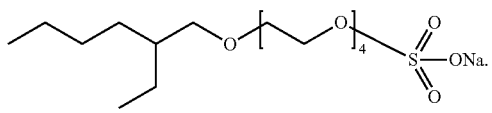

In certain example aspects, where the compound is of formula (XIII), $R_{12}$ can be a $C_1$ to $C_8$ linear or branched alkyl group. In other example aspects, the compound can have the following structure:

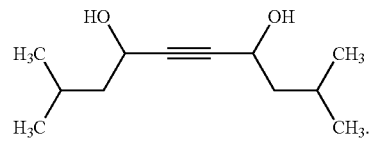

In yet further example aspects, the compound can have the following structure:

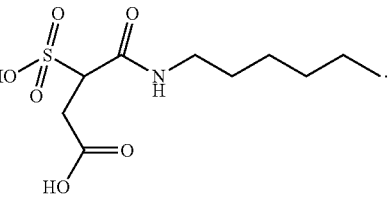

According to various example aspects the leaching solution can include a lixiviant; and one or more of the compounds described above.

In yet other example aspects, the disclosure relates to a method of leaching a metal from an ore, the method comprising: contacting the ore comprising the metal with any of the leaching solutions described above. Contacting the ore can include variety of leaching techniques including heap leaching, dump leaching, vat leaching or agitation leaching. The metal can be selected from a group consisting of copper, gold, silver, nickel, zinc, molybdenum, vanadium, uranium, and combinations thereof. In certain aspects, the metal comprises copper. In certain aspects, the ore is agglomerated or not agglomerated.

In further example aspects, the disclosure relates to a method of recovering a metal from an ore, comprising: contacting the ore comprising the metal with any of the leaching solutions described above to form a pregnant leaching solution; and recovering the metal from the pregnant leaching solution. The recovering of the metal can include a solvent extraction process. In certain aspects, the compound in the leaching solution can be compatible with the solvent extraction process. Recovering the metal can include an electrowinning process where the compound in the leaching solution is compatible with the electrowinning process. The metal can be selected from a group consisting of copper, gold, silver, nickel, zinc, molybdenum, vanadium, uranium, and combinations thereof. In certain aspects, the metal is copper and the lixiviant is sulfuric acid or the metal is gold and/or silver and the lixiviant is an alkaline cyanide solution.

The above summary provides a basic understanding of the disclosure. This summary is not an extensive overview of all contemplated aspects, and is not intended to identify all key or critical elements or to delineate the scope of any or all aspects of the disclosure. Its sole purpose is to present one or more aspects in a summary form as a prelude to the more detailed description that follows and the features described and particularly pointed out in the claims.

BRIEF DESCRIPTION OF THE DRAWINGS

The present disclosure is illustrated by way of example, and not by way of limitation, in the figures of the accompanying drawings in which like references indicate similar elements.

DETAILED DESCRIPTION

Figure 1:
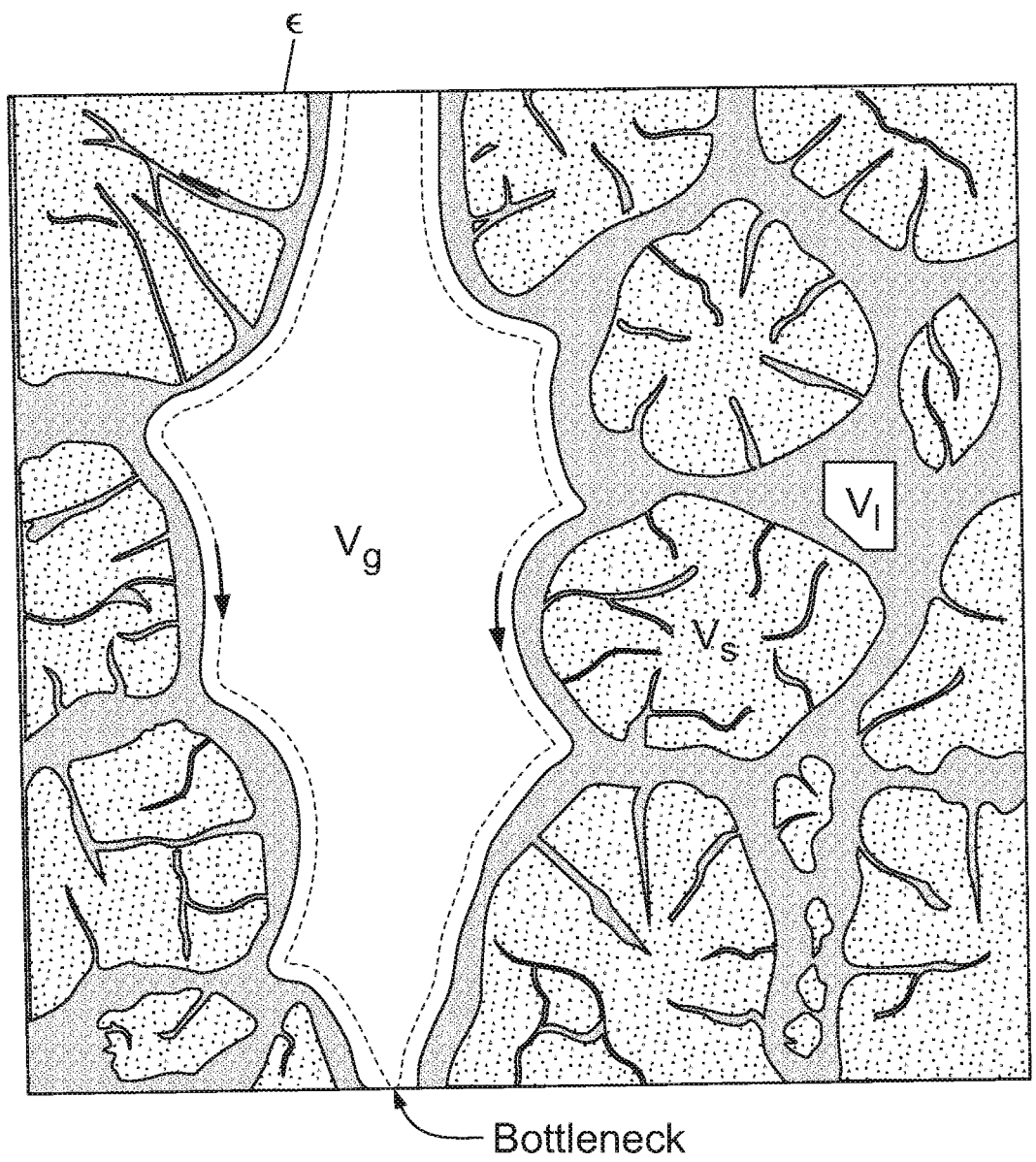
FIG. 1 depicts a representation of a path of a leaching solution through channels and ore crevices wrought with 'dead-ends.'

Example aspects are described herein in the context of leaching aids in leaching solutions and methods of using the leaching aids. Those of ordinary skill in the art will recognize that the following description is illustrative only and is not intended to be in any way limiting. Other aspects will readily suggest themselves to those of ordinary skill in the art having the benefit of this disclosure. Reference will now be made in detail to implementations of the example aspects as illustrated in the accompanying drawings. The same reference indicators will be used to the extent possible throughout the drawings and the following description to refer to the same or like items.

According to various example aspects, the disclosure is directed to leaching solutions including leaching aids for improving the rate of recovery and/or the total recovery of metals from non-agglomerated or agglomerated ore. The leaching solutions are compatible with various mining processes including solvent extraction and electrowinning.

The leaching solutions can comprise leaching aids which include, but are not limited to, one or any combination of the following classes of compounds:

Sulfonate-, sulfate-, or carboxylate-capped, alkoxylated compounds

Betaines

Alkyl- and alkyl ether sulfates

Sulfosuccinates, alkoxylates (e.g., alkoxylated polyols), sulfosuccinamides

Acetylenic diols

Amphoacetates/propionates

More particularly, according to various example aspects of the disclosure, the leaching solutions can include a lixiviant and one or more leaching aid having formula (I) as follows:

$$R((AO)_nB)_m((AO)_nH)_p \quad (I)$$

where each AO group is, independently, an alkyleneoxy group selected from ethyleneoxy ("EO"), 1,2-propyleneoxy ("PO"), 1,2-butyleneoxy, and styryleneoxy; n is an integer from 0 to 40; m is an integer from 1 to the total number of OH hydrogens in the R group prior to alkoxylation; p is an integer such that the sum of m plus p equals the number of OH hydrogens in the R group prior to alkoxylation; B is H, $SO_3Y$, $(CH_2)_qSO_3Y$, $CH_2CHOHCH_2SO_3Y$, or $CH_2CH(CH_3)OSO_3Y$, wherein q is an integer from 2 to 4 and Y is a cation; R is a group selected from formula (II) to (VIII) as follows:

$$R_1C(CH_2O)_3 \quad (II)$$

where $R_1$ is H, methyl, ethyl, or propyl;

$$C(CH_2O)_4 \quad (III);$$

$$OC(CH_2O)_2 \quad (IV);$$

$$N(CH_2CH_2O)_3 \quad (V);$$

$$(R_2)_xN(CH_2CH_2O)_y \quad (VI)$$

where $R_2$ is a $C_1$-$C_4$ alkyl, y is 1-3 and x+y=3;

$$O(CH_2)_rO \quad (VII),$$

where r is 2 to 6; and $$O(CH(CH_3)CH_2)O \quad (VIII).$$

According to various example aspects, n can be 2 to 30, or 2 to 20, or 2 to 10, B can be Hydrogen and R can have formula (II). For example, the leaching solution can include a leaching aid comprising a distribution of compounds including the following structure, which leaching aid may be referred to herein as "TMP-7(EO)":

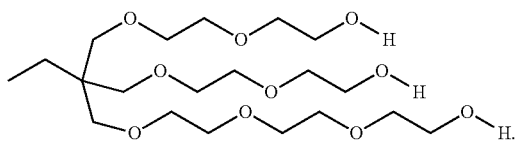

The TMP-7(EO) Leaching Aid can be formed by an alkoxylation process of trimethylolpropane ("TMP"), where the process results in a mixture (i.e., a distribution) of trimethylolpropane compounds having a variety of ethylene oxide ("EO") units including: TMP-$EO_{x,y,z}$, where x, y and z are independently an integer from 0 to 7, with the proviso that x+y+z=7. The resulting mixture of compounds includes one of the above TMP-7(EO) structure.

The alkoxylation is preferably catalyzed by strong bases which are added in the form of an alkali metal alcoholate, alkali metal hydroxide or alkaline earth metal hydroxide, in an amount of about 0.1% to about 1% by weight, based on the amount of the alkanol RZiOH (cf. G. Gee et al., J. Chem. Soc. (1961), page 1345; B. Wojtech, Makromol. Chem. 66, (1966), page 180).

An acid catalysis of the addition reaction is also possible. In addition to Bronstedt acids, Lewis acids, such as, for example, $AlCl_3$ or $BF_3$ dietherate, $BF_3$, $BF_3H_3PO_4$, $SbCl_4 \cdot 2H_2O$ or hydrotalcite are also suitable (cf. P. H. Plesch, The Chemistry of Cationic Polymerization, Pergamon Press, New York (1963)). Double metal cyanide (DMC) compounds are also suitable as the catalyst.

All suitable compounds known to a person of ordinary skill in the art can in principle be used as the DMC compound.

DMC compounds suitable as a catalyst are described, for example, in WO 99/16775 and DE-A-101 17 273. Particularly suitable catalysts for the alkoxylation are double metal cyanide compounds of the general formula (A):

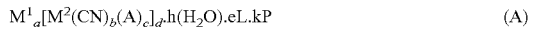

where
$M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Eu^{3+}$, $Ti^{3+}$, $Ti^{4+}$, $Ag^+$, $Rh^{2+}$, $Rh^{3+}$, $Ru^{2+}$ and $Ru^{3+}$,
$M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$, A and X, independently of one another, are an anion selected from the group consisting of halide, hydroxide, sulfate, carbonate, cyanide, thiocyanate, isocyanate, cyanate, carboxylate, oxalate, nitrate, nitrosyl, hydrogen sulfate, phosphate, dihydrogen phosphate, hydrogen phosphate and bicarbonate, L is a water-miscible ligand selected from the group consisting of alcohols, aldehydes, ketones, ethers, polyethers, esters, polyesters, polycarbonate, ureas, amides, primary, secondary and tertiary amines, ligands comprising pyridine nitrogen, nitriles, sul?des, phosphides, phosphites, phosphanes, phosphonates and phosphates, k is a fraction or integer greater than or equal to zero and P is an organic additive, a, b, c, d, g and n are selected so that the electroneutrality of the compound (I) is ensured, it being possible for c to be 0, e, the number of ligand molecules, is a fraction or integer greater than 0 or is 0, f and h, independently of one another, are a fraction or integer greater than 0 or are 0.

The organic additive P can include: polyether, polyester, polycarbonates, polyalkylene glycol sorbitan ester, polyalkylene glycol glycidyl ether, polyacrylamide, poly(acrylamide-coacrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-coacrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose, polyacetates, ionic surface-active and interface-active compounds, gallic acid or its salts, esters or amides, carboxylic esters of polyhydric alcohols and glycosides.

These catalysts may be crystalline or amorphous. Where k is zero, crystalline double metal cyanide compounds are preferred. Where k is greater than zero, crystalline, semicrystalline and substantially amorphous catalysts are preferred.

Preferred embodiment catalysts can be of the formula (A) in which k is greater than zero. The preferred catalyst then comprises at least one double metal cyanide compound, at least one organic ligand and at least one organic additive P.

According to certain example aspects, k is zero, e is optionally also zero and X is exclusively a carboxylate, preferably for mate, acetate and propionate. Such catalysts are described in WO 99/1 6775. Here, crystalline double metal cyanide catalysts are preferred. Double metal cyanide catalysts as described in WO 00/74845, which are crystalline or lamellar, are furthermore preferred.

The preparation of the modified catalysts is effected by combining a metal salt solution with a cyanometallate solution which may optionally comprise both an organic ligand L and an organic additive P. The organic ligand and optionally the organic additive are then added. In a preferred embodiment of the catalyst preparation, an inactive double metal cyanide phase is first prepared and this is then converted into an active double metal cyanide phase by recrystallization, as described in PCT/EP01/01893.

According to other example aspects of the catalysts, f, e and k are not zero. These are double metal cyanide catalysts which comprise a water-miscible organic ligand (in general in amounts of from 0.5 to 30% by weight) and an organic additive (in general in amounts of from 5 to 80% by weight), as described in WO 98/06312. The catalysts can be prepared either with vigorous stirring (24,000 rpm using a Turrax) or with stirring, as described in U.S. Pat. No. 5,158,922.

Particularly suitable catalysts for the alkoxylation are double metal cyanide compounds which comprise zinc, cobalt or iron or two thereof. For example, Prussian Blue is particularly suitable.

Crystalline DMC compounds are preferably used. In certain aspects, a crystalline DMC compound of the $Zn_4Co$ type, which comprises zinc acetate as a further metal salt component, is used as the catalyst. Such compounds are crystallized with a monoclinic structure and have a lamellar habit. Such compounds are described, for example, in WO 00/74845 or PCT/EP01/01893.

DMC compounds suitable as a catalyst can be prepared in principle by all methods known to the person skilled in the art. For example, the DMC compounds can be prepared by direct precipitation, by the incipient Wetness method or by preparation of a precursor phase and subsequent recrystallization.

The DMC compounds can be used as a powder, paste or suspension or can be shaped to give a molding, introduced into moldings, foams or the like or applied to moldings, foams or the like.

The catalyst concentration used for the alkoxylation, based on the final quantity range, is typically less than 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm.

The addition reaction can be carried out at temperatures of about 90° C. to about 2400° C., preferably from 120° C. to 1800° C., in a closed vessel. The alkylene oxide or the mixture of different alkylene oxides is added to the mixture of alkanol mixture according to the invention and alkali under the vapor pressure of the alkylene oxide mixture which prevails at the chosen reaction temperature. If desired, the alkylene oxide can be diluted with up to about 30% to 60% of an inert gas. This provides additional safety with regard to prevention of explosive polyaddition of the alkylene oxide.

If an alkylene oxide mixture is used, polyether chains in which the different alkylene oxide building blocks are virtually randomly distributed are formed. Variations in the distribution of the building blocks along the polyether chain are the result of different reaction rates of the components and can also be achieved randomly by continuous feeding of an alkylene oxide mixture of program-controlled composition. If the different alkylene oxides are reacted in succession, polyether chains having a block-like distribution of alkylene oxide building blocks are obtained.

The length of the polyether chains varies randomly within the reaction product about a mean value of the stoichiometric value substantially resulting from the added amount.

Alkoxylate mixtures of the general formula (B) (below) can be obtained by reacting alcohols of the general formula $C_5H_{11}CH(C_3H_7)CH_2OH$ with propylene oxide/ethylene oxide in the abovementioned sequence under alkoxylation conditions.

$$R^1-O-(CH_2-CHR^5-O-)_z(CH_2-CH_2-O-)_n$$
$$(CH_2-CHR^6-O-)_x(CH_2-CHR^2-O-)_mH \quad (B)$$

where
$R^1$ is at least singly branched $C_{4-22}$-alkyl or -alkylphenol,
$R^2$ is $C_{3-4}$-alkyl,
$R^5$ is $C_{1-4}$-alkyl,
$R^6$ is methyl or ethyl,
n has a mean value of from 1 to 50,
m has a mean value of from 0 to 20,
r has a mean value of from 0 to 50,
s has a mean value of from 0 to 50,
m being at least 0.5 if $R^5$ is methyl or ethyl or has the value 0.

Suitable alkoxylation conditions are described above and in Nikolaus Schönfeldt, Grenzflächenaktive Äthylenoxid-Addukte, Wissenschaftliche Verlagsgesellschaft mbH Stuttgart 1984. As a rule, the alkoxylation is carried out in the presence of basic catalysts, such as KOH, in the absence of a solvent. The alkoxylation can, however, also be carried out with the concomitant use of a solvent. A polymerization of the alkylene oxide is initiated in which a random distribution of homologs inevitably occurs, the mean value of which is specified here with p, n, m and q.

According to various example aspects of the present disclosure, the leaching solution can include a lixiviant and a mixture of compounds formed by an alkoxylation process of trimethylolpropane with seven equivalents of ethylene oxide as described above, wherein the resulting distribution of trimethylolpropane compounds having ethylene oxide units have the following general formula: $TMP\text{-}EO_{x,y,z}$, where x, y and z are independently an integer from 0 to 7, with the proviso that $x+y+z=7$. The mixture comprises the following compound:

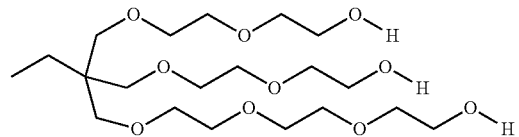

In other example aspects of the present disclosure, the leaching solution can include a leaching aid having formula (IX) as follows:

(IX)

where $R_3$ is a $C_1$ to $C_{20}$ linear or branched alkyl group comprising zero or more substitutions with any of O, N, OH or

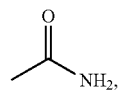

$R_4$ and $R_6$ are each, independently, H, a $C_1$ to $C_{10}$ linear or branched alkyl group or an alcohol group, and $R_5$ is a $C_1$ to $C_{10}$ linear or branched alkyl group. In the present disclosure, the term "alcohol group" means a $C_1$ to $C_x$ linear or branched alkyl group having an —OH functionality where x is an integer, for example, x can be from 2 to 10 or from 2 to 20.

According to various example aspects, $R_3$ can be a $C_{10}$ linear or branched alkyl group and $R_4$, $R_5$ and $R_6$ can be, independently, a $C_1$ to $C_3$ alkyl group. For example, the leaching solution can include a leaching aid having the following structure, which compound may be referred to herein as "MC1000":

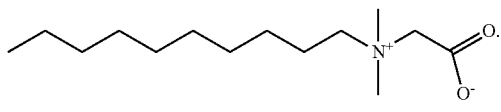 [SMILES: CCCCCCCCCC[N+](C)(C)CC(=O)[O-]]

According to certain aspects, $R_3$ can include at least one

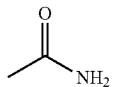

substitution, and $R_4$ and $R_6$ can be, independently, H or an alcohol group. For example, the leaching solution can include a leaching aid having the following structure:

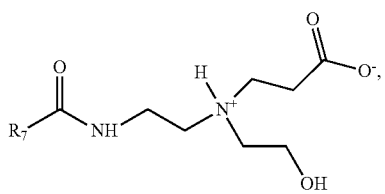

where $R_7$ is a $C_1$ to $C_{20}$ linear or branched alkyl group comprising zero or more substitutions with any of O, N, OH or

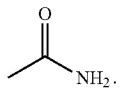

In accordance with various example aspects, the leaching solution can include a leaching aid such as an alkyl or alkyl ether sulfate having formula (X) or (XI) as follows:

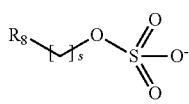
(X)

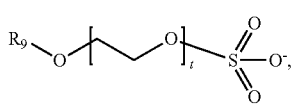
(XI)

where s and t are each, independently, an integer from 0 to 10 and $R_8$ and $R_9$ are each, independently, a $C_1$ to $C_{20}$ linear or branched alkyl group.

In various example aspects, the leaching solution can include a leaching aid having formula (XII) as follows:

$R_{10}CH_2OC(O)C(SO_3^-)CH_2C(O)OCH_2R_{11}Na^+$ (XII), where $R_{10}$ and $R_{11}$ are each, independently, a $C_1$ to $C_6$ linear or branched alkyl group.

The leaching solution can include, in various example aspects, an acetylenic diol as a leaching aid having the following formula (XIII)

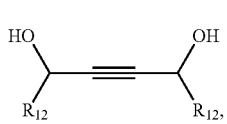
(XIII)

where $R_{12}$ is a $C_1$ to $C_6$ linear or branched alkyl group.

The leaching solution can include, an amphoacetate as a leaching aid having the following formula (XIV):

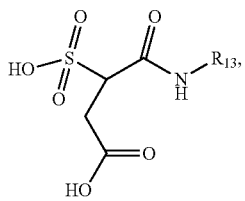
(XIV)

wherein $R_{13}$ is a $C_2$ to $C_{20}$ linear or branched alkyl group.

According to various example aspects of the disclosure, the one or more leaching aids can be added to any leaching solution for any type of leaching technique where an aqueous solution is used to remove metal from an ore. The one or more leaching aids can be added to the leaching solution at a total concentration of about 1 parts per million ("ppm") to about 2000 ppm, or about 5 ppm to about 50 ppm, or about 5 ppm to about 100 ppm, or about 15 ppm to about 30 ppm, or about 10 ppm to about 1000 ppm, or about 20 ppm to about 500 ppm, or about 10 ppm to about 100 ppm, or about 10 ppm to about 50 ppm, or about 25 ppm to about 50 ppm of the leaching solution, or about 50 ppm to less than the critical micelle concentration of the leaching aid. Critical micelle values can be, for example, about 100 ppm to about 1000 ppm. For example, the leaching solution can include a leaching aid of formula (I) or (IX) at a total concentration of about 5 ppm to about 50 ppm, or about 5 ppm to about 100 ppm, or about 15 ppm to about 30 ppm, or about 25 ppm, or about 10 ppm to about 100 ppm, or about 25 ppm to about 50 ppm of the leaching solution. According to certain example aspects of the disclosure, the leaching solution can include the TMP-7(EO) leaching aid or the MC1000 leaching aid at a total concentration of about 5 ppm to about 50 ppm, or about 5 ppm to about 100 ppm, or about 15 ppm to about 30 ppm, or about 10 ppm to about 100 ppm, or about 25 ppm to about 50 ppm, or about 25 ppm of the leaching solution.

According to various example aspects of the disclosure, a leaching solution can include a lixiviant and one or more leaching aid of formulas (I) and (IX)-(XIV) described above. For example, the leaching solution can include both the TMP-7(EO) leaching aid and the MC1000 leaching aid.

The lixiviant can be any suitable acid or base for leaching metal values from an ore. For example, the lixiviant can be sulfuric acid, ammonia, ammonium carbonate, ammonium sulfate, ammonium chloride or cyanide solutions. In the case of copper-containing ores, the lixiviant can be, for example, sulfuric acid or ammonia. For certain gold-containing ores, the lixiviant can be, for example, an alkaline cyanide solution.

The metal/metalloid values can be in ionic form and/or in elementary form. The metals/metalloids can be one or more of copper, gold, silver, nickel, zinc, molybdenum, vanadium, uranium, and combinations thereof. In certain example aspects, the metal can be copper.

The use of the ore leaching aids described herein can reduce the surface tension of the leaching solution and provide better wetting of the ore during heap leaching whether or not the ore is agglomerated. Additionally, this reduction in surface tension can prevent or reduce capillary action in the microscopic crevices of the ore.

When examining an ore, it can be observed that the path of a leaching solution must navigate through a labyrinth of channels and ore crevices wrought with 'dead-ends' (see FIG. 1). Robert W. Bartlett, *Solution Mining Leaching and Fluid Recovery of Materials*, p. 138. Once a leaching solution flows into a crevice and reacts with the surface of the ore, the now spent solution containing the desired metal is retained in the crevice due to capillary action. This results in no further leaching of the ore in that crevice. To aid in the leaching solution's flow through the channels and to achieve extraction of the valuable metal from ore crevices, a decrease in surface tension of the leaching solution can allow for a less hindered path for the extracted metal to pass.

The addition of surface active agents as leaching aids to the leaching solution can liberate the metal-containing solution from the crevices allowing fresh solution to penetrate into the crevices. For example, the capillary action can be reduced to about 80%, or about 70% or about 60% less than that of water alone through the addition of one or more of the leaching aids. This decrease in capillary action liberates the leaching solution from the crevice, which ultimately increases the rate of recovery and/or the total recovery of metal from the ore.

The leaching aids according to various example aspects of the disclosure, are compatible with several processes and process conditions, including, but not limited to, agglomeration, leaching, solvent extraction, and electrowinning. The one or more leaching aids can have no or a limited impact on other processes, such that they are compatible with downstream processes after the one or more leaching aids have been used to recover the metal during leaching.

For example, solvent extraction is a carefully orchestrated balance of various metal and acid concentrations. The foundation of many forms of solvent extraction are built around the hydrogen ion cycle:

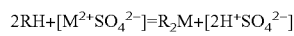

$$2RH+[M^{2+}SO_4^{2-}]=R_2M+[2H^+SO_4^{2-}]$$

Vladimir S. Kislik, *Solvent Extraction: Classical and Novel Approaches*, p. 191.

Figure 2:
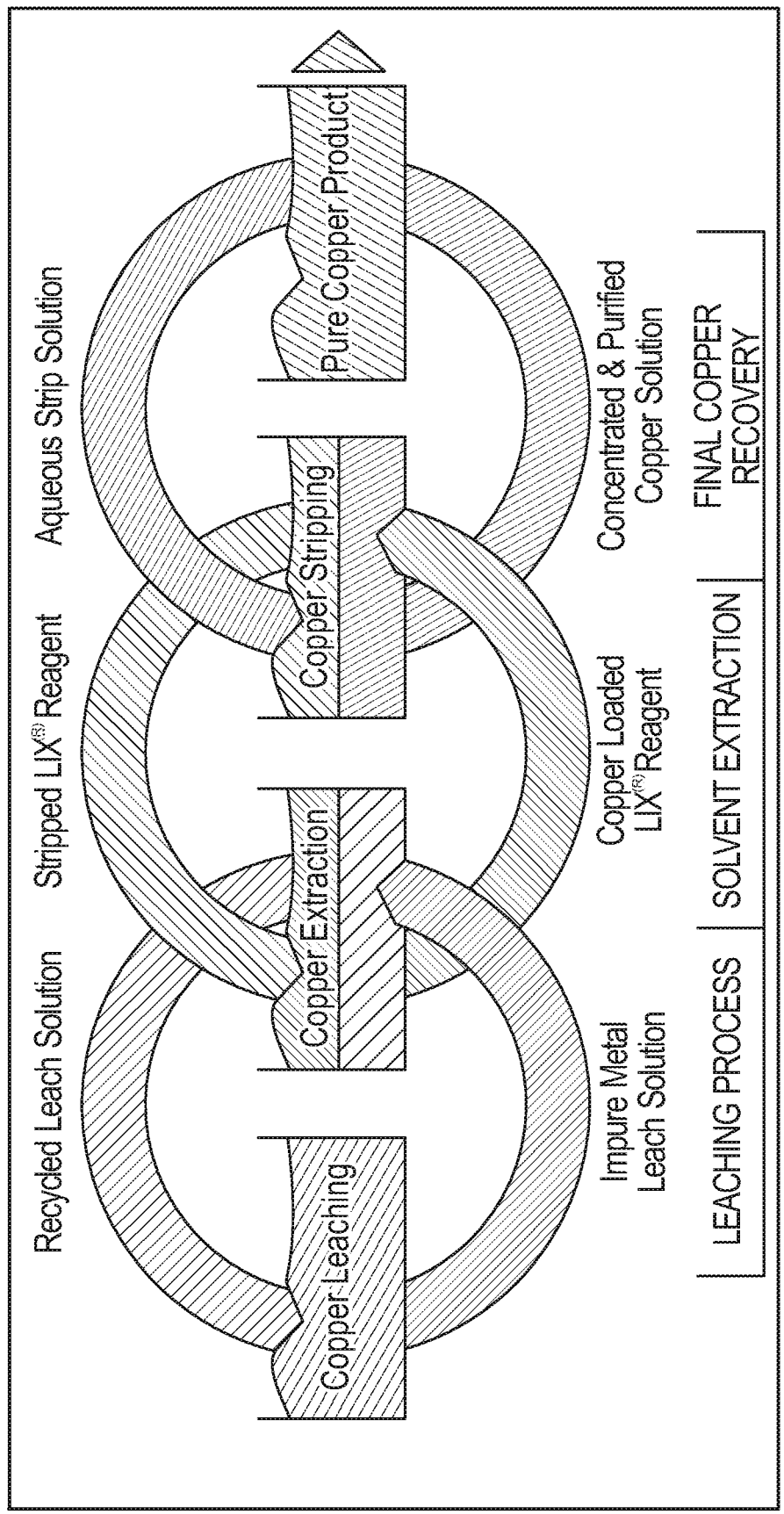
FIG. 2 depicts a representation of a copper solvent extraction process.

The delicate chemical balance that is inherent to all solvent extraction operations can be negatively affected by the slightest interloper. For example, in a copper solvent extraction process, all of the processes are interconnected and form a symbiotic relationship as shown in FIG. 2. Because of this relationship it is possible that if an additive is meant to amplify one part of the process (e.g., copper leaching) it could easily disrupt another segment (e.g., copper extraction) due to incompatible chemistry. Issues such as these can include: the formation of emulsions, entrainment, introduction of impurities into the tankhouse, manipulation of extraction and/or strip kinetics, degradation or staining of the reagent, or nullification of a particular step of the process. According to various example aspects of the disclosure, the leaching aids are compatible with leaching, extraction, stripping and electrowinning operations and do not result in the above mentioned issues.

According to various example aspects of the disclosure, the leaching aid can be added to a lixiviant solution that is passed through an ore during an extraction process. The ore may be subjected to an agglomeration process prior to leaching with the lixiviant solution. In certain example aspects, the leaching aid can be added to water and the lixiviant (e.g., sulfuric acid) used in an agglomeration process with no further addition of the leaching aid to the lixiviant solution circulated through the ore to leach the metal (e.g., copper). In yet further example aspects, the leaching aid can be added to a portion of the lixiviant solution with or without the addition of additional acid for use as an agglomeration aid followed by passing lixiviant through the ore with or without the leaching aid.

The one or more leaching aids used for improving the rate of recovery and/or total recovery of metals from ore, where the ore may or may not have been agglomerated, and which are compatible with numerous mining processes, can have various general characteristics. For example, the leaching aids can be anionic, cationic, nonionic or amphoteric surfactants or mixtures thereof. In certain example aspects, the leaching aids can be low-foaming surfactants.

Suitable cationic surfactants include tetraalkylammonium salts, imidazolinium salts, amine oxides or mixtures thereof. For example, $C_8$- to $C_{16}$-dialkyldimethylannnonium salts, dialkoxydimethylammonium salts, imidazolinium salts having a long-chain alkyl radical, or mixtures thereof.

Suitable amphoteric surfactants include carboxylic acids, for example, ethylenically unsaturated carboxylic acids, and/or at least one ethylenically unsaturated monomer unit of the general formula $R^1(R^2)C=C(R^3)R^4$, where R1 to R4, independently of one another, are —H, —$CH_3$, a straight-chain or branched saturated alkyl radical having 2 to 12 carbon atoms, a straight-chain or branched, mono- or poly-unsaturated alkenyl radical having 2 to 12 carbon atoms, alkyl or alkenyl radicals as defined above which are substituted by —$NH_2$, —OH or —COOH, a heteroatomic group having at least one positively charged group, a quaternized nitrogen atom or at least one amino group having a positive charge in the pH range from 2 to 11 or are —COOH or —$COOR_5$, where $R_5$ is a saturated or unsaturated, straight-chain or branched hydrocarbon radical having 1 to 12 carbon atoms. Examples of the abovementioned monomer units are diallylamine, methyldiallylamine, tetramethylammonium salts, acrylamidopropyl(trimethyl)ammonium salts ($R^1$, $R^2$ and $R^3$=H, $R^4$=C(O)NH($CH_2$) $2N^+(CH_3)_3X^-$), methacrylamidepropyl(trimethyl)ammonium salts ($R^1$ and $R^2$=H, $R^3$=$CH_3$, H, $R_4$=C(O)NH($CH_2$) $2N^+(CH_3)_3X^-$).

For example, amphoteric surfactants can include, as monomer units, derivatives of diallylamine, in particular, dimethyldiallylammonium salt and/or methacrylamidopropyl(trimethyl)ammonium salt, for example, in the form of the chloride, bromide, iodide, hydroxide, phosphate, sulfate, hydrogen sulfate, ethylsulfate, methylsulfate, mesylate, tosylate, formate or acetate, and/or in combination with ethyleneically unsaturated carboxylic acid monomer units.

Suitable non-ionic surfactants can include alcohol alkoxylates (e.g., alkoxylated polyols), alkylphenol alkoxylates, alkylpolyglucosides, N-alkylpolyglucosides, N-alkylglucamides, fatty acid alkoxylates, fatty acid polyglycol esters, fatty acid amine alkoxylates, fatty acid amide alkoxylates, fatty acid alkanolamide alkoxylates, N-alkoxypolyhydroxy-fatty acid amides, N-aryloxypolyhydroxy-fatty acid amides, block copolymers of ethylene oxide, propylene oxide and/or butylene oxide, polyisobutene alkoxylates, polyisobutene/maleic anhydride derivatives, fatty acid glycerides, sorbitan esters, polyhydroxy-fatty acid derivatives, polyalkoxy-fatty acid derivatives, bisglycerides, or mixtures thereof.

Suitable anionic surfactants can include fatty alcohol sulfates, sulfated alkoxylated alcohols, alkanesulfonates, N-acyl sarcosinates, alkylbenzenesulfonates, olefin sulfonates and olefin disulfonates, alkyl ester sulfonates, sulfonated polycarboxylic acids, alkylglyceryl sulfonates, fatty acid glyceryl ester sulfonates, alkylphenol polyglycol ether sulfates, paraffinsulfonates, alkyl phosphates, acyl isothionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, sulfated alkylpolyglycosides, alkylpolyglycol carboxylates, hydroxyalkyl sarcosinates or mixtures thereof.

Additional characteristics of the leaching aids include high water solubility in the aqueous leaching solution to avoid extraction into the organic phase during solvent extraction. Other characteristics of the leaching aids include high critical micelle concentrations and stability at acidic pH. The leaching aids can minimize foaming, and one or more surfactants can decrease the surface tension of the leaching solution. The leaching aids also should have no or minimal impact on any other process related to extraction of the metal (e.g. leaching, solvent extraction, stripping and electrowinning including mixing, phase disengagement, extraction and strip kinetics, copper/iron selectivity or build up in the organic over time). Suitable leaching aids furthermore, should be stable under the acidic conditions of the leaching solution (e.g., sulfuric acid) in an aqueous phase and should be biodegradable. Moreover, suitable leaching aids according to various example aspects of the disclosure can increase overall metal recovery (e.g., copper recovery) by at least 3%. In certain aspects, the suitable leaching aids according to the disclosure can increase overall metal recovery by about 0.5% to about 20% or about 1% to about 20%, or about 2% to about 20%, or about 5% to about 20%, or about 0.5% to about 10% or about 2% to about 10% or about 5% to about 10%.

EXAMPLES

The following examples illustrate the effect of leaching aids according to various example aspects of the disclosure. While the examples described below used copper containing ore, it is to be understood that the examples are illustrative of any metal-containing ore body.

Example 1—Column Testing

In order to reduce the variables in the leaching tests, the ore was precisely classified by SGS in Tucson, Ariz. The ore was a mostly copper oxide ore that had a P80 of 1.5" and a smallest fraction of −10 mesh. The distribution of the column charge can be found in Table 1. The copper concentration in the ore was 0.42% with 91.2% of the copper as acid soluble copper. Analysis of the ore was also verified by SGS in Tucson.

TABLE 1

Distribution of particle sizes of copper ore in leach tests.
Particle Size Distribution
Crush Size P80 of 37.5 mm (1.5 inch)

| Particle Size | | Sample | Wt |
|---|---|---|---|
| mm | inch | (Kg) | (%) |
| 37.5 | 1½ | 18.0 | 20.0 |
| 25 | 1 | 32.0 | 35.5 |
| 19 | ¾ | 9.3 | 10.3 |
| 12.5 | ½ | 7.7 | 8.6 |
| 6.3 | ¼ | 7.4 | 8.2 |
| 1.7 | 12 | 8.1 | 9.0 |
| minus | | 7.6 | 8.4 |

Approximately 90 Kg of agglomerated ore was leached for 60 days in batches in 16 columns, at which point roughly 75% of the total copper was leached (total copper per column was approximately 380 g). Each set of column trials consisted of the 16 columns containing approximately 90 Kg of ore. Four columns were set aside as blanks and had no leaching aid added. For the leaching aids, test conditions were run in triplicate. The first set of column runs consisted of triplicates of Leaching Aid-A (i.e., the MC-1000 leaching aid referred to in this study as "LA-A") at the following doses: LA-A (50 ppm dose), LA-A (25 ppm dose), and Leaching Aid-B (i.e., the TMP-7(EO) leaching aid referred to in this study as "LA-B") at the following doses: LA-B (50 ppm dose), and LA-B (25 ppm dose). The LA-B dose was removed as the higher dose was not as effective.

Sixteen 2 M by 20 cm PVC columns were used to hold 90 Kg of ore per column. A distribution felt was used to evenly dispense the lixiviant solution onto the ore. Four of the columns were constructed of clear PVC so that the system could be visibly inspected. Each column had its own high precision pump and lixiviant reservoir. Solution was collected from the bottom of the column into buckets which eventually were put onto analytical balances so that the amount of solution could be easily tracked. The leach rate was 8 mL/min of 10 g/L sulfuric acid at 68° F. The lixiviant was added in a one pass system where there was no recirculation of the lixiviant.

Samples were collected daily for the first 30 days of the 60 day leaching trials. For each column, a sample was analyzed for pH, free acid, copper concentration by AA, surface tension, and oxidation potential (ORP). The lixiviant samples were also analyzed each day to ensure that there was no contamination or change in concentration of chemical species. The solution feed rates were measured every day and if any adjustments were needed, the appropriate changes were made.

Figure 3A:
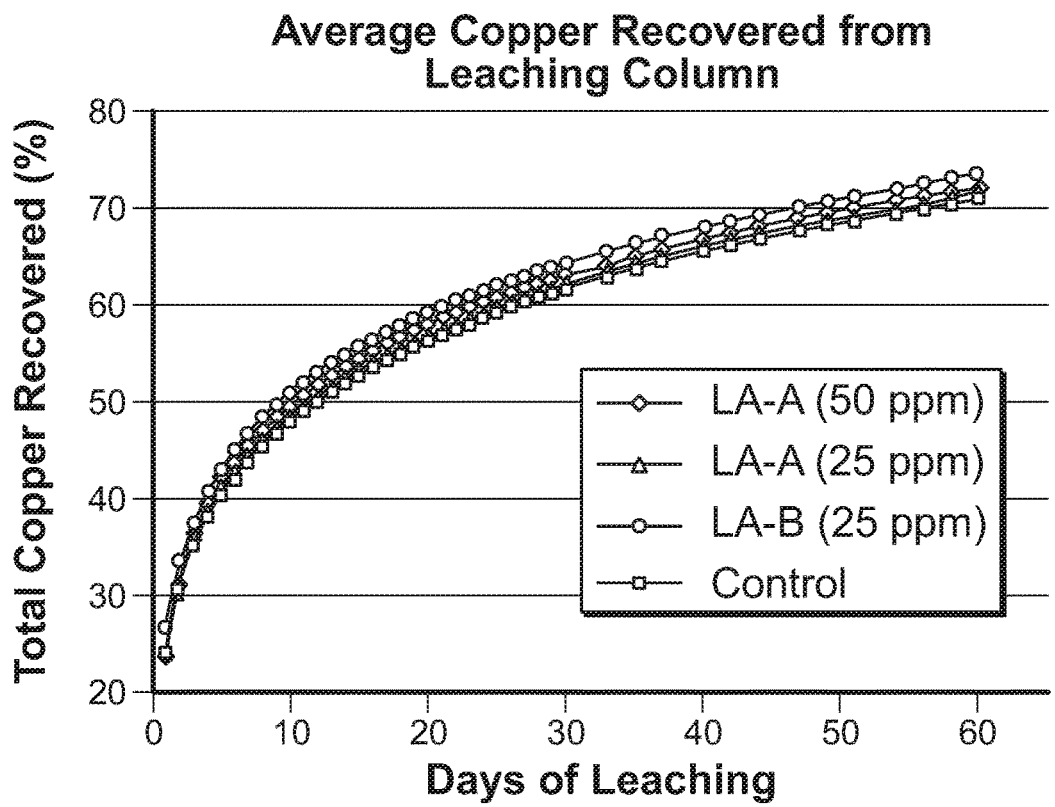
FIG. 3A is a chart showing results for a first column trial from Example 1 and compares total copper recovered (%) per day for different materials.
Figure 3B:
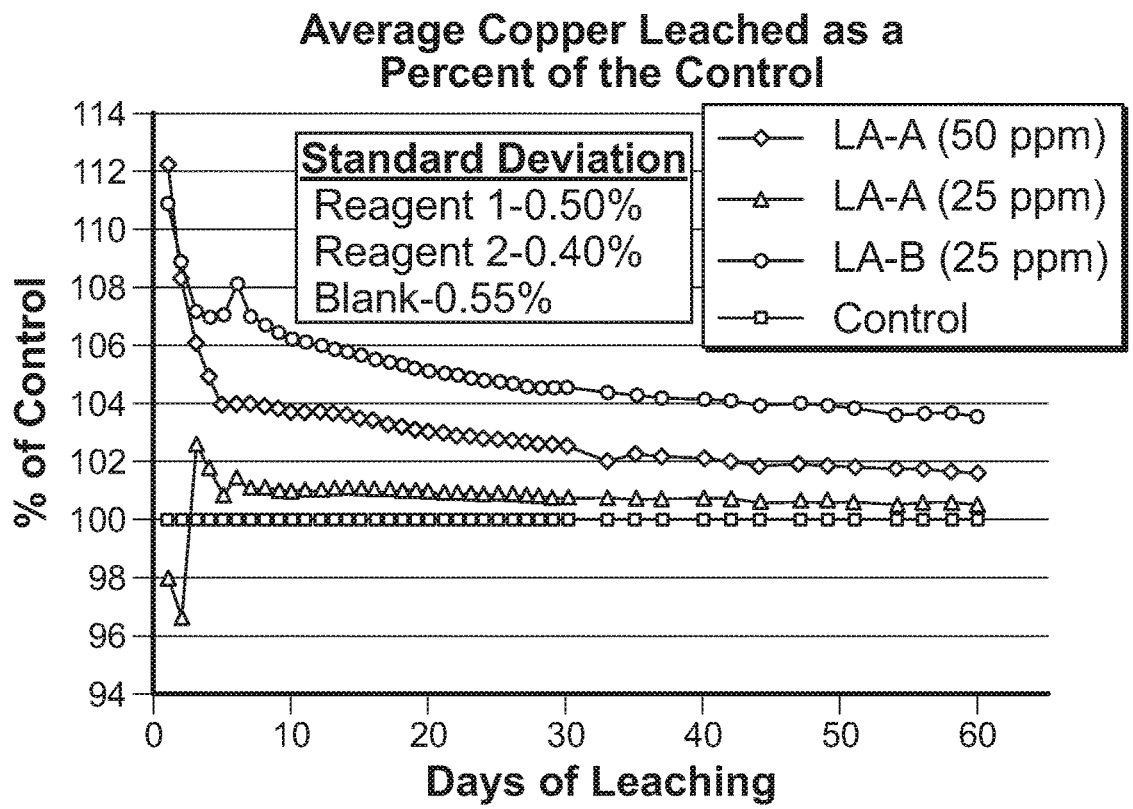
FIG. 3B is a chart showing results for a first column trial from Example 1 and compares percent of control (%) per day for different materials.

As can be seen in FIGS. 3A and 3B, the columns ran for 60 days. At that time, the amount of copper leached was approximately 75% of the 92.1% of the copper in the ore that was acid soluble (from a bottle roll test). At this point copper leaching began to slow enough so that the trial was terminated. Due to the care with which the ore was processed and the columns leached in addition to using a predominantly oxide ore, the standard deviation of the leaching results between columns was very low. Agglomeration was accomplished by mixing the various fractions in a cement mixer with 1.75 Kg of water and 1.52 Kg of sulfuric acid. The acid was calculated as 25% of the total acid consumption by ore. The agglomerated material was then transferred to columns for the leaching trials.

In order to show the efficiency of the leaching aid, the data in FIGS. 3A and 3B is plotted as the percent of copper leached in excess of the control. The first ten days of leaching resulted in substantial increases in copper leaching for the LA-B (25 ppm) and the LA-A (50 ppm). At the end of the 60 day leach cycle, the LA-A (25 ppm) had resulted in an average of 3.7% increase in copper leached from the ore.

Figure 4A:
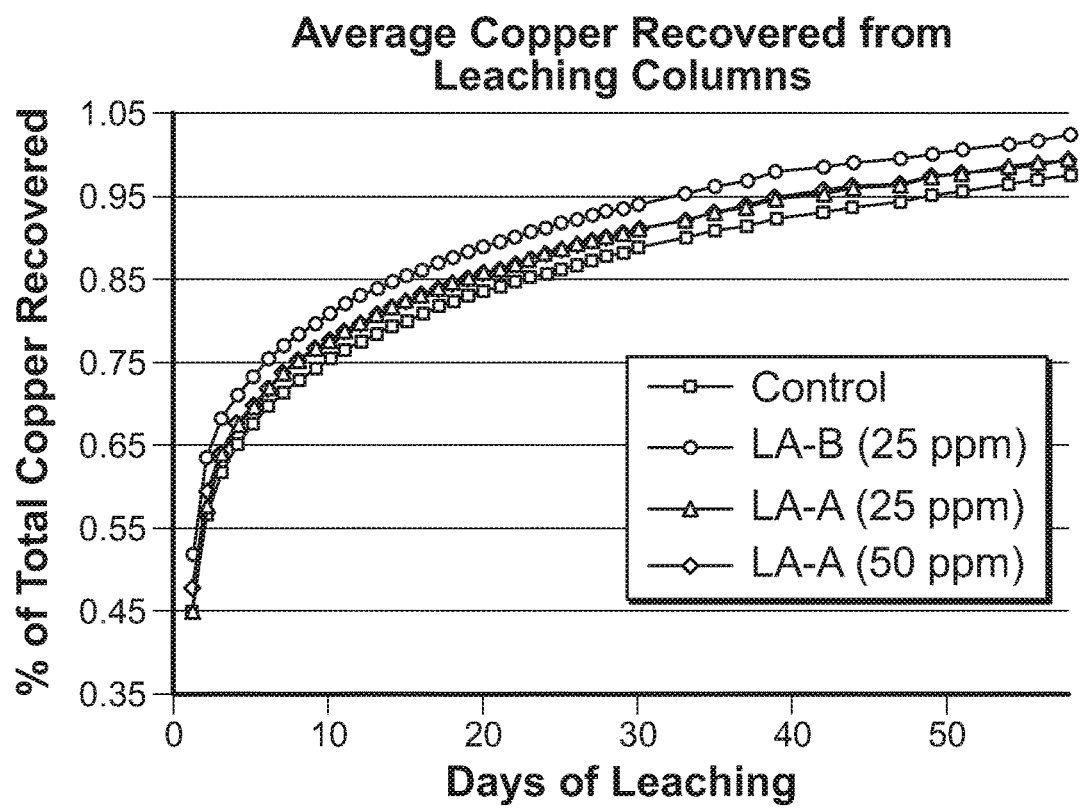
FIG. 4A is a chart showing results for a second column trial from Example 1 and compares total copper recovered (%) per day for different materials.
Figure 4B:
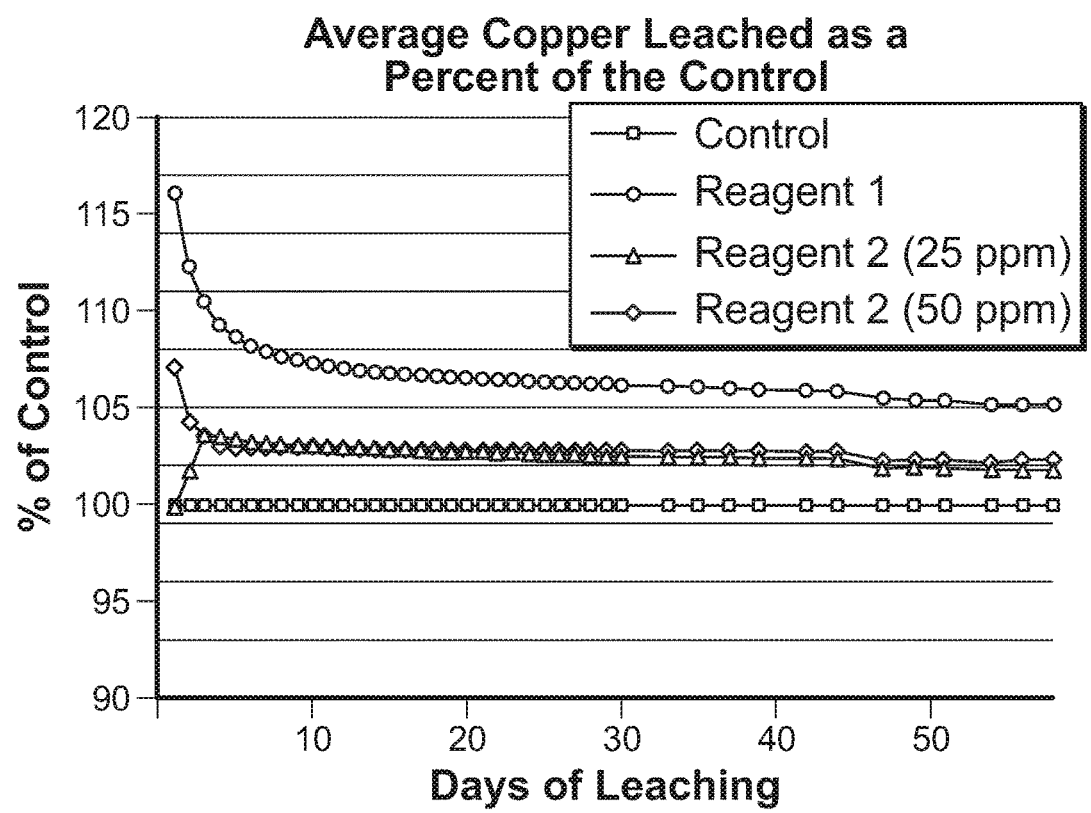
FIG. 4B is a chart showing results for a second column trial from Example 1 and compares percent of control (%) per day for different materials.
Figure 5A:
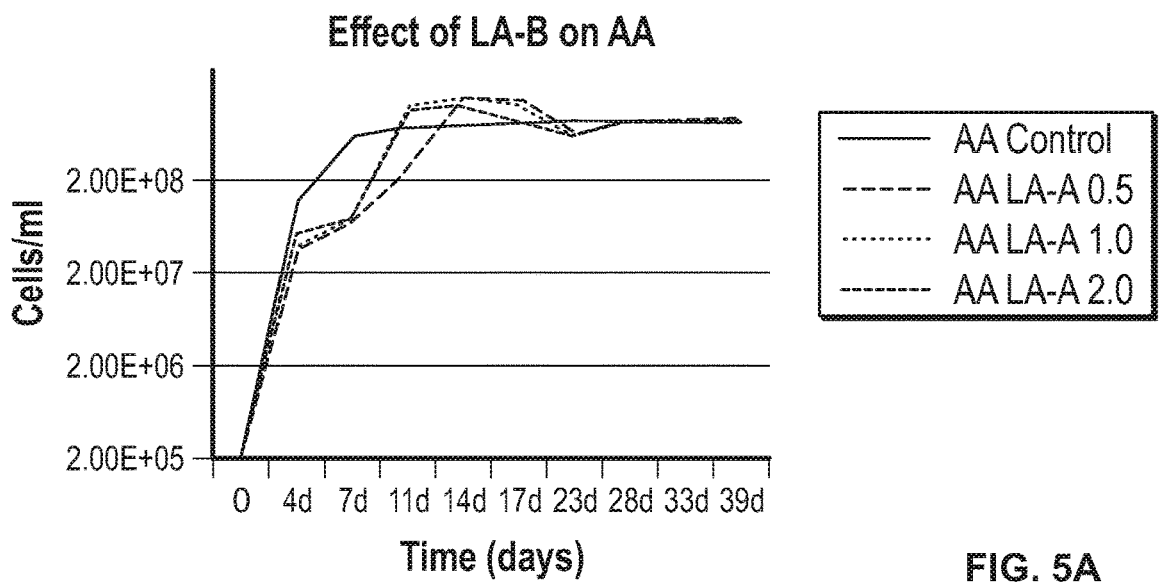
FIG. 5A is a chart showing biological compatibility results for a leaching aid comparing cells/mL per day for *Acidophilium acidophilum* (AA)—heterotroph.
Figure 5B:
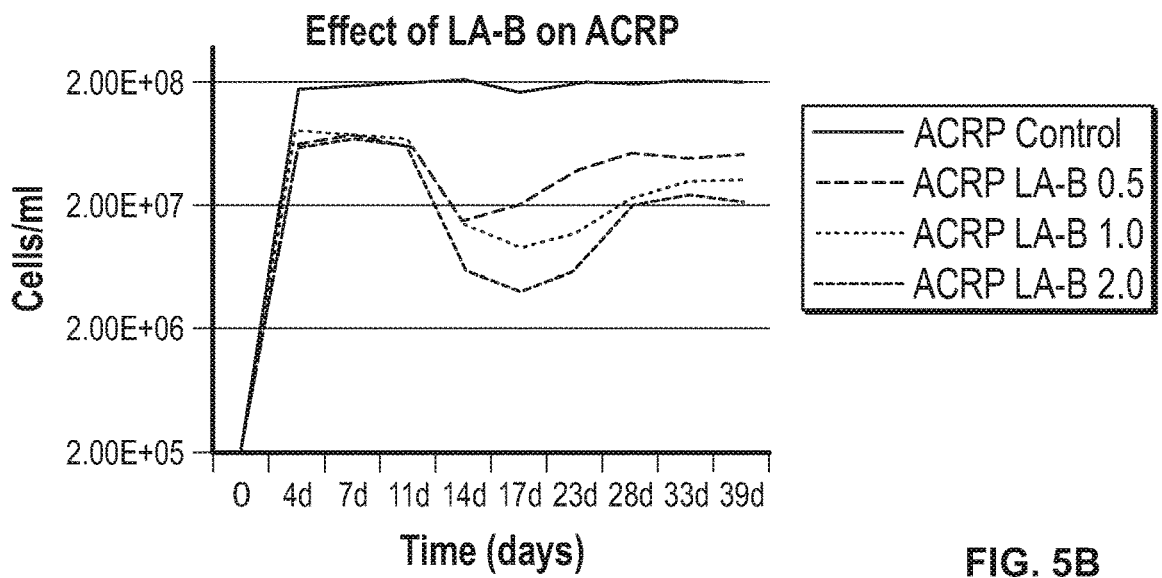
FIG. 5B is a chart showing biological compatibility results for a leaching aid comparing cells/mL per day for *Acidiphilium cryptum* (ACRP)—heterotroph.
Figure 5C:
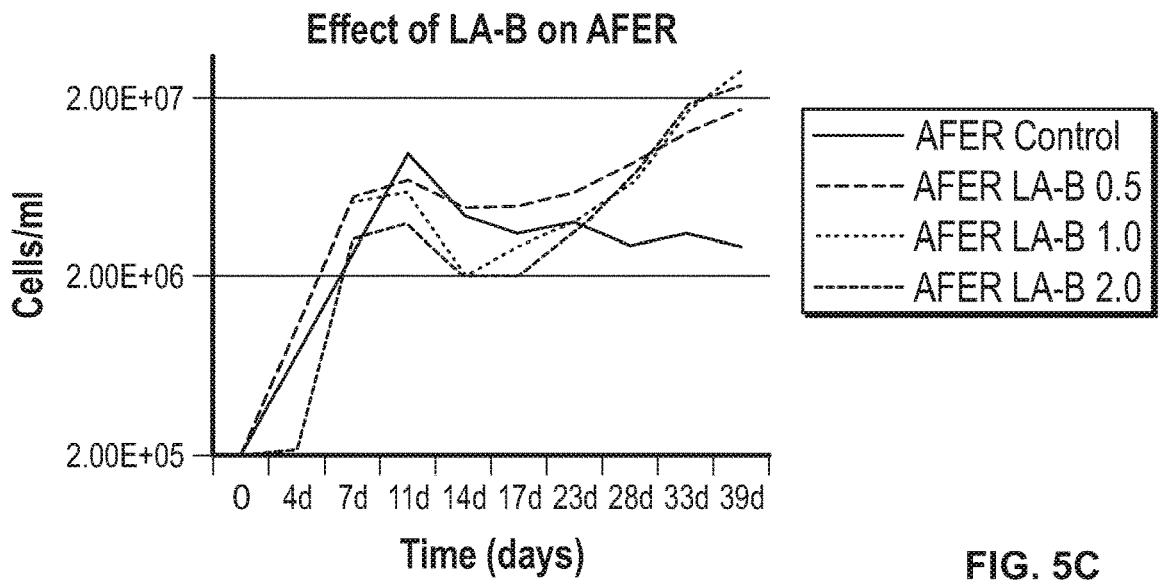
FIG. 5C is a chart showing biological compatibility results for a leaching aid comparing cells/mL per day for *Acidithiobacillus ferrivorans* (AFER)—iron and sulfur oxidizer (tested on iron).
Figure 5D:
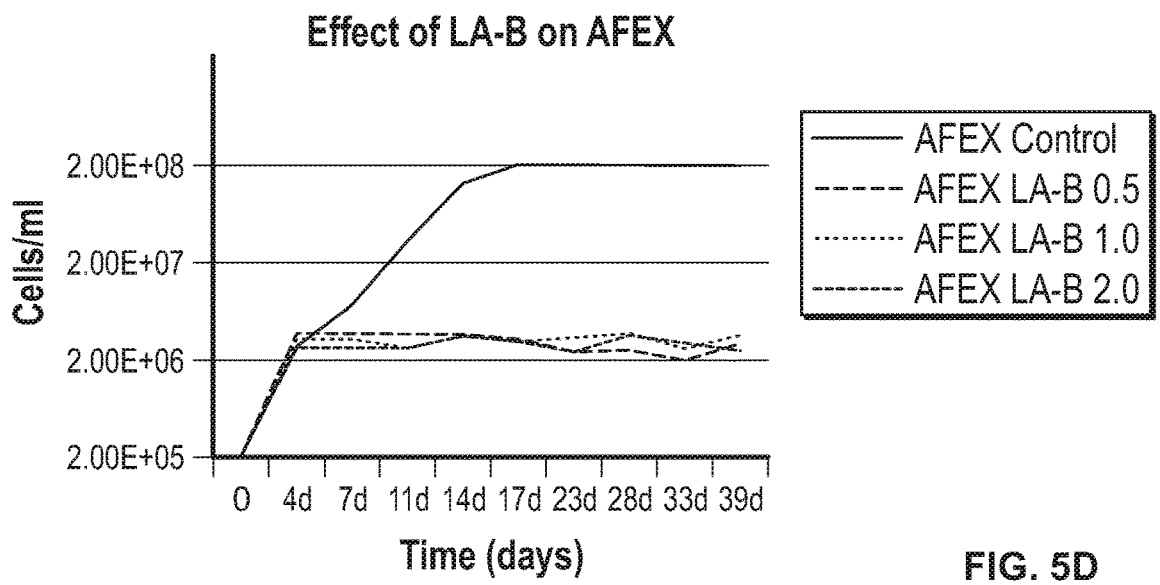
FIG. 5D is a chart showing biological compatibility results for a leaching aid comparing cells/mL per day for *Acidithiobacillus ferrooxidans* (AFEX)—iron oxidizer.
Figure 5E:
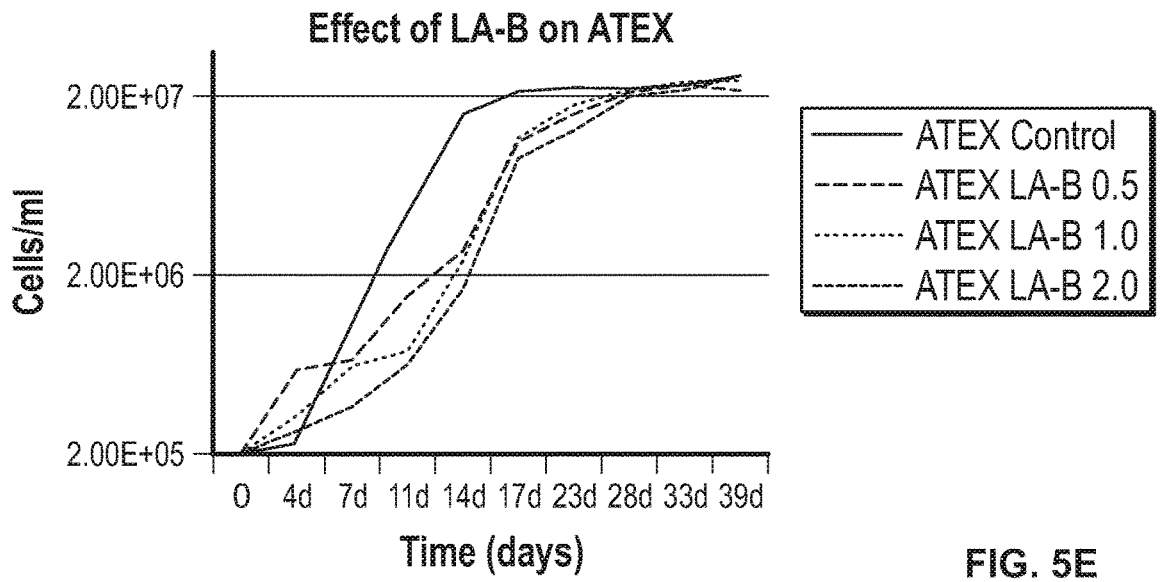
FIG. 5E is a chart showing biological compatibility results for a leaching aid comparing cells/mL per day for *Acidithiobacillus thiooxidans* (ATEX)—sulfur oxidizer.
Figure 5F:
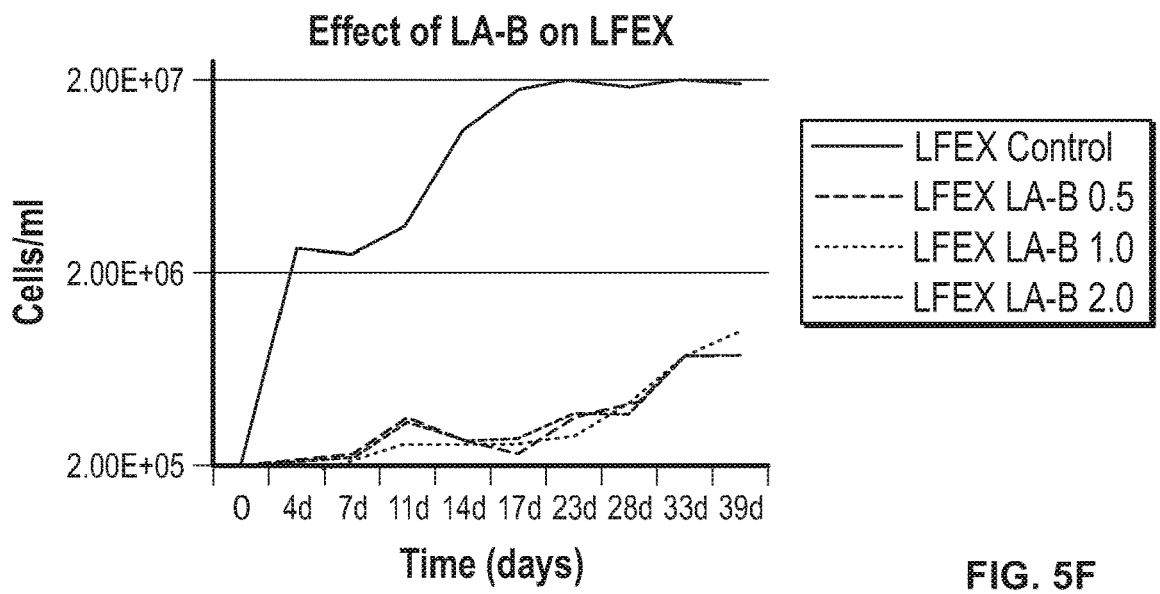
FIG. 5F is a chart showing biological compatibility results for a leaching aid comparing cells/mL per day for *Leptospirillum ferrooxidans* (LFEX)—iron oxidizer.
Figure 5G:
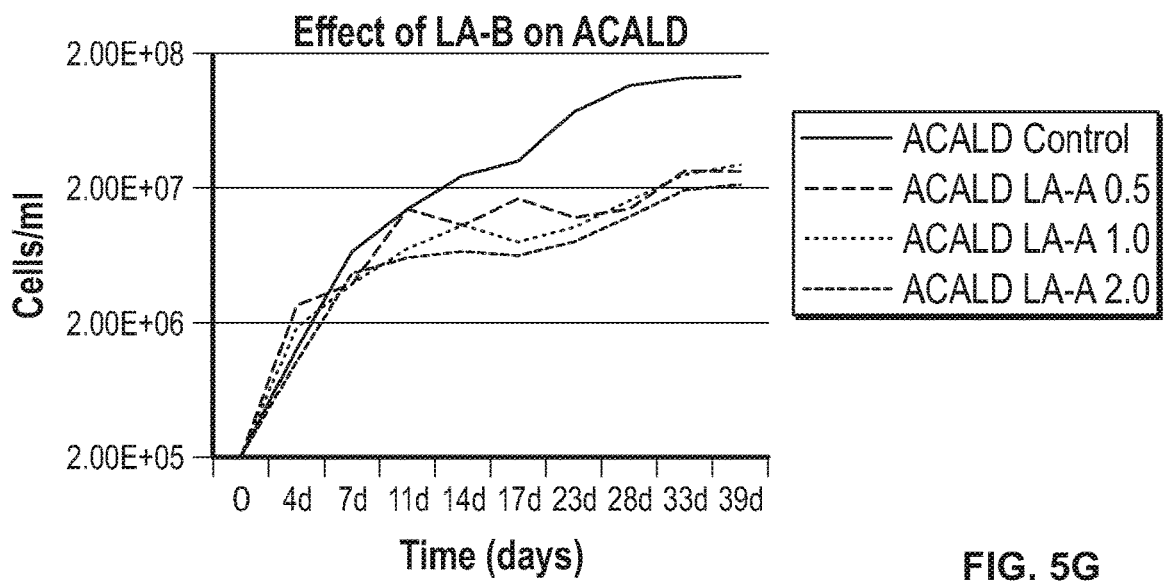
FIG. 5G is a chart showing biological compatibility results for a leaching aid comparing cells/mL per day for *Acidithiobacillus caldus* (ACALD)—sulfur oxidizer.
Figure 5H:
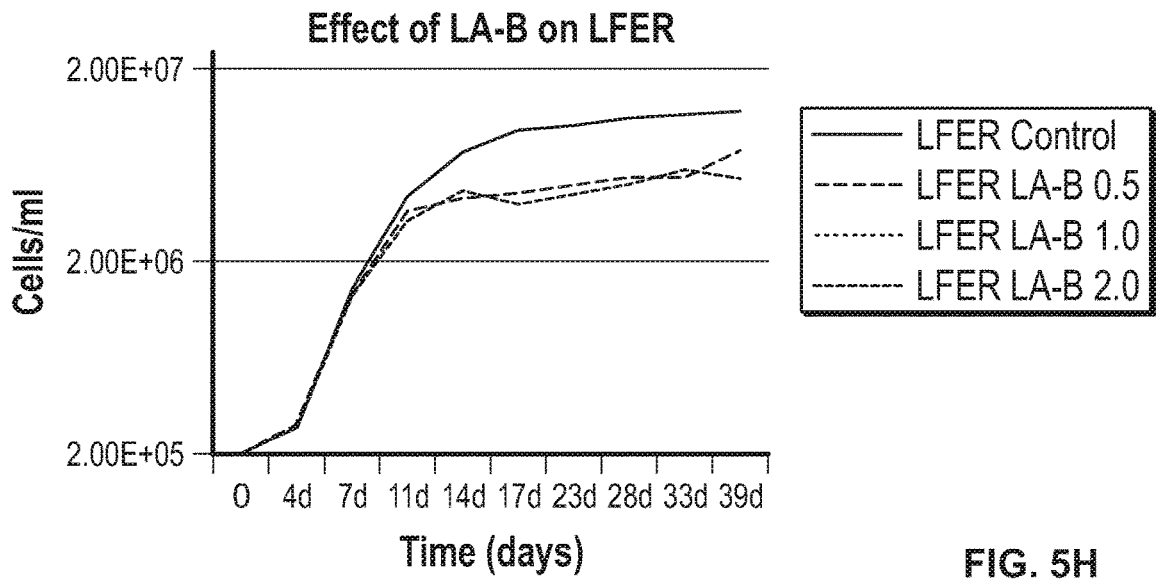
FIG. 5H is a chart showing biological compatibility results for a leaching aid comparing cells/mL per day for *Leptospirillum ferriphilum* (LFER)—iron oxidizer.
Figure 5I:
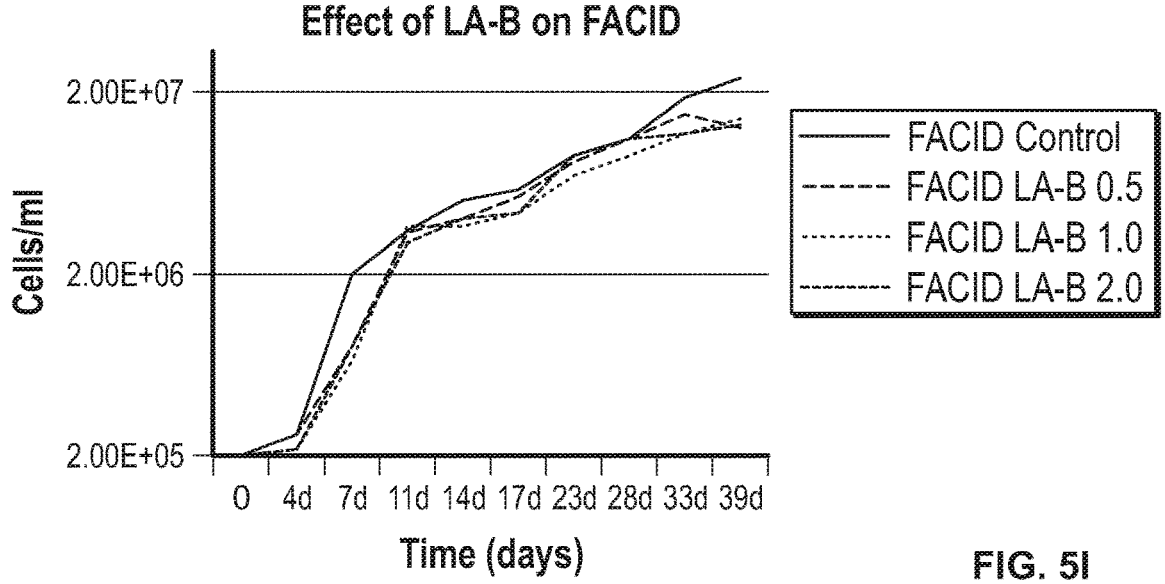
FIG. 5I is a chart showing biological compatibility results for a leaching aid comparing cells/mL per day for *Ferroplasma acidiphilum* (FACID—archea iron oxidizer.
Figure 5J:
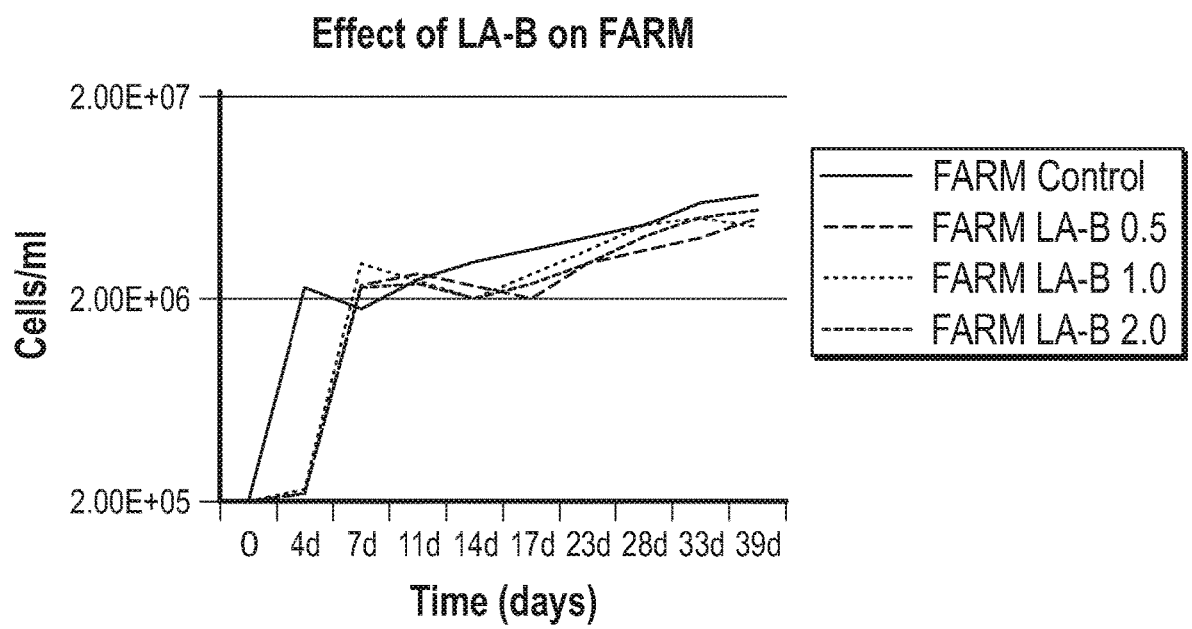
FIG. 5J is a chart showing biological compatibility results for a leaching aid comparing cells/mL per day for *Ferroplasma acidarmanus* (FARM)—archea tested on iron oxidization.
Figure 5K:
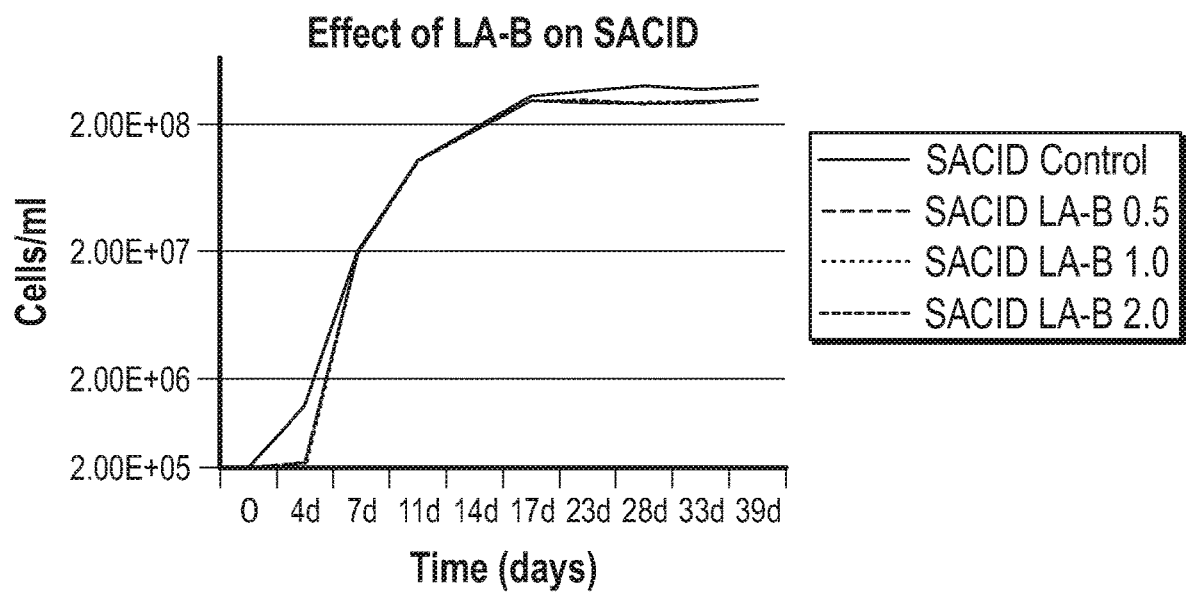
FIG. 5K is a chart showing biological compatibility results for a leaching aid comparing cells/mL per day for and *Sulfobacillus acidphilum* (SACID)—archea tested on iron oxidation.

The second set of column trials was essentially a repeat of the first set of column trials with a slight modification of the agglomeration procedure. As in the first trial the lixiviant was not recirculated, but was added in a one pass system. As in the previous set of experiments, the LA-B (25 ppm) had a substantial increase in copper leaching, approximately 5% more copper leached than the control. Overall, the amount of copper leached in this trial was quite high, reaching the amount of copper leachable from the bottle test. FIGS. 4A and 4B details the results of the second column trial.

Example 2—Biological Testing

Compatibility testing with sulfur and iron oxidizing bacteria was conducted in order to ensure that the leaching aids will not negatively affect the biological respiration necessary to convert secondary sulfide copper to copper sulfate in solution. Biological testing was performed by Universal BioMining (UBM), a research group working on biological heap leaching.

A series of biological species relevant to mining applications were inoculated with the leaching aids and given relevant feed solutions; *Acidophilium acidophilum* (AA)—heterotroph, *Acidiphilium cryptum* (ACRP)—heterotroph, *Acidithiobacillus ferrivorans* (AFER)—iron and sulfur oxidizer (tested on iron), *Acidithiobacillus ferrooxidans* (AFEX)—iron oxidizer, *Acidithiobacillus thiooxidans* (ATEX)—sulfur oxidizer, *Leptospirillum ferrooxidans* (LFEX)—iron oxidizer, *Acidithiobacillus caldus* (ACALD)—sulfur oxidizer, *Leptospirillum ferriphilum* (LFER)—iron oxidizer, *Ferroplasma acidiphilum* (FACID—archea iron oxidizer, *Ferroplasma acidarmanus* (FARM)—archea tested on iron oxidization, and *Sulfobacillus acidiphilum* (SACID)—archea tested on iron oxidation.

A quantitative growth curve study was performed to determine the effect of the chemical additives on two organism groups, mesophiles and moderate thermophiles (28 and 42 degrees Celsius). These groups contained 3 sub-groups of metabolic function (heterotroph, iron oxidizers, sulfur oxidizers), primarily consisting of bacteria from several archaea. The two leaching aids were labeled as "LA-A" (i.e., MC-1000) and "LA-B" (i.e., TMP-7(EO)) for the purposes of the biological testing. The growth curves were scheduled to be completed within 45 days or when the cultures were deemed stabilized. Growth media utilized was UBM's base salt media UX2 with appropriate substrates and optimal initial pH values for each organism. Each BASF chemistry was tested in triplicate and at three (3) different concentrations; 0.5× target concentration, target concentration, and 2× target concentration. Samples on triplicate cultures were taken every 3-5 days depending on the growth rate of the organisms, and cell counts were performed. Data was provided for LA-B exclusively.

The biological compatibility results for the LA-B leaching aid are shown in FIGS. 5A-5K. For the two heterotrophs, organisms that derive their nutrition from organic chemical species, there was no negative effect for the AA and for the ACRP there was an initial loss of population but there was a recovery which included a scavenging of organic from the death of organisms. In the case of the sulfur oxidizers, there was little impact of the leaching aid on cell colonies. For the ACALD there was a slowing down of population growth at approximately 14 days; however, then the growth resumed. Iron oxidizing species were either not affected at all or had some level of inhibition. AFEX and LFEX were the two iron oxidizing bacteria that showed the most growth inhibition. After 40 days LFEX population was a little more than an order of magnitude less than the control while the AFEX population was two orders of magnitude less than the control. The difference in the metabolic rates did not seem to have a correlation to the difference in growth between control and leaching aid inoculation. In addition, the concentration of the leaching aid did not seem to have an effect on metabolic activity. The data indicates that the use of the leaching aid will not result in any significant long term loss of biological leaching capability.

Example 3—Chemical Compatibility

Three single stage lab circuits were set up with individual surge tanks. Each surge tank was filled with 500 ml of 10% v/v LIX984N that has been contacted once with O:A 1:1 QC electrolyte (160 g/L sulfuric acid and 35 g/L copper). Flow rates were 30 mL/min of organic and 30 mL/min of aqueous. Mixer speed was kept at 1750 rpm. Circuit operation was performed at room temperature, which was approximately 21° C. The feed solution was made from tap water, 10 g/L sulfuric acid and 50 ppm of the appropriate leach aid. The lab circuits were run for 96 hours of continuous mixing. Visual observation during and at the end of the run showed no increase in emulsion or crud. The starting virgin organic and the three circuit organics after continuous circuit testing were put through a standard kinetics test.

Homologues of LA-A (i.e., MC-1000) and LA-B (i.e., TMP-7(EO)) were extensively tested for solvent extraction and electrowinning compatibility due to their ability to reduce surface tension. In all cases, the LA-A series of chemical compounds with the same chemical backbone were compatible with SX-EW. The testing regime included static kinetics testing, phase disengagement, and in some cases doping of solutions run in a dynamic circuit. Table 2 details the application testing data for the chemical compatibility. These tests were conducted using the standard conditions outlined in the BASF method for quality control of oxime reagents entitled Standard Quality Control Test of LIX® Reagents (Doc. No. TG—TSH—05, Rev. 4, Sep. 14, 2015), which is incorporated by reference herein in its entirety.

TABLE 2

Application testing for organic reagents where system is spiked with leaching aids.

|  | Control | LA-A | LA-B |
|---|---|---|---|
| Extraction Kinetics 90s | 96.1% | 98.9% | 92.3% |
| Copper Extraction Eq. (g/L) | 4.685 | 4.674 | 4.619 |
| Strip Kinetics 90s | 99.60% | 99.30% | 99.80% |
| Copper Strip Eq (g/L) | 1.51 | 1.46 | 1.49 |
| Phase Disengagement (organic) | 54 | 202 | 61 |
| Phase Disengagement (aqueous) | 110 | 132 | 111 |

The samples were run in a continuous circuit for three days with PLS spiked with the leaching aid at twice the standard dosage, 50 ppm. The samples were then tested for phase disengagement and kinetics. The extraction kinetics at 90 s for the LA-B are a little lower, at 92.3%, than desired; however, the equilibrium extraction is equivalent to the control. The strip kinetics were unaffected, suggesting that any contamination is not in the organic. The phase disengagement for the LA-A doping was substantially affected, while the phase disengagement for the LA-B doping was unaffected. This data would suggest that the LA-B reagent is compatible with solvent extraction.

Copper cathode was plated using a rectifier and simple EW system. In the case of both the LA-A and LA-B homologues, the effect of adding a leaching aid was similar to that of a smoothing agent. This is due to the reduction of the surface tension and the attraction of the polar functional groups of the leaching aid to the high charge density of copper cathode dendrites. In no cases was there any negative impact from the leaching aid.

Examples Based on Preliminary Testing

Example 4

Figure 6:
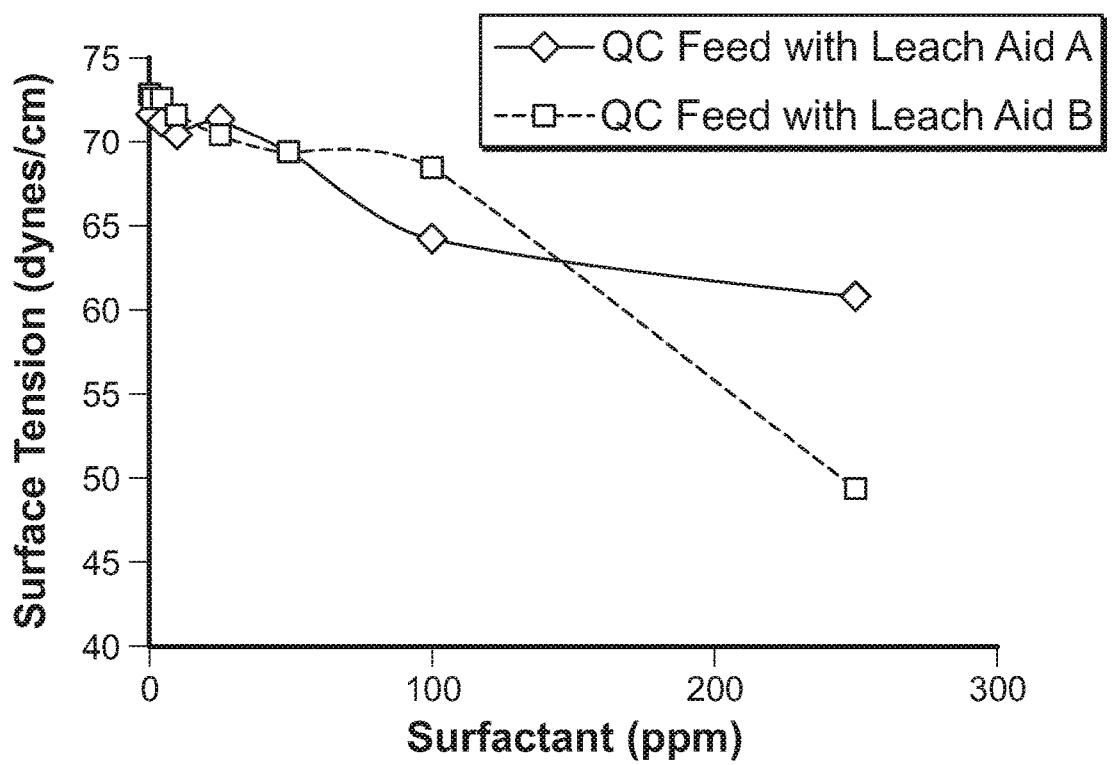
FIG. 6 is a chart showing results for Example 4 that compares surface tension (dynes/cm) with concentration of a leaching aid (ppm).

This example investigated a method for determining the impact of a leaching aid on the surface tension of a typical leaching solution. A synthetic pregnant leaching solution ("PLS") of 6 g/L copper and 2 g/L iron at a pH of about 2.0 was prepared in deionized ("DI") water to form a quality control ("QC") feed. To this, mixtures of synthetic PLS having varying levels of Leach aid A (i.e., MC1000) or Leach Aid B (i.e., TMP-7(EO)) were prepared and the surface tension of each solution was measured. The surface tension (dynes/cm) as a function of the concentration of the leaching aid (ppm) was plotted as shown in FIG. 6. As shown, the surface tension decreased with increasing concentration of the leaching aid.

Example 5

In this example, two carboys were filled with a synthetic leach solution and one of the solutions was spiked with 10 ppm of MC1000 leaching aid. In two different batches, 1 L of organic solution was prepared from 20 v/v % LIX684N-LV in Shellsol D70 for each test. A one stage solvent extraction circuit was constructed for each of the control solution (i.e., no leaching aid) and the leaching aid solution. One of the organic solution batches was incorporated into each circuit, such that the control solution and the leaching aid solution were in constant contact with one of the organic solutions. The circuits were configured to maintain 3 min retention times, with the ratio of organic to aqueous ("O:A") at about 2:1 (vol/vol) at room temperature with an aqueous flow rate of about 100 ml/h. An aqueous recycle was used to maintain the O:A with continuous mixing of the organic solutions.

The organic solutions from these circuits were removed after operating continuously for about one week. About 400 ml of each organic solution was contacted with about 400 ml of a synthetic QC electrolyte and the organic and aqueous continuous phase breaks were recorded. Subsequently, the organics were decanted and filtered through No. 1 PS ("phase separator") paper to remove any entrained electrolyte for use in the standard QC test. Both organics were run through a standard QC test for LIX reagents with the addition of running both extraction and strip break times in both continuities, and the pulling of two additional kinetic samples during extraction and strip mixing.

TABLE 3

Example 5 Results for the Leach Aid and Blank

| | | Leach Aid | Blank |
|---|---|---|---|
| Pre QC test | Organic break | 168 | 89 |
| | Aqueous Break | 104 | 60 |
| Extraction | Organic break | 60 | 69 |
| | Aqueous Break | 176 | 133 |
| Strip | Organic break | 96 | 67 |
| | Aqueous Break | 130 | 129 |
| | Pre circuit ML | 11.644 | 11.66 |
| | Post circuit ML | 11.74 | 11.73 |
| | SO | 2.348 | 2.354 |
| | E30 | 6.726 | 6.836 |
| | E60 | 7.182 | 7.288 |
| | E90 | 7.412 | 7.436 |
| | E300 | 7.692 | 7.6 |
| | S30 | 2.902 | 2.884 |
| | S60 | 2.878 | 2.874 |
| | S90 | 2.86 | 2.866 |
| | S300 | 2.86 | 2.846 |
| | E300 Fe | 0.0035 | 0.0034 |
| | E30 kinetics | 87.4% | 89.9% |
| | S30 kinetics | 99.1% | 99.2% |
| | Cu/Fe | 2198 | 2235 |

Example 5 showed that over the period of a week the results for the Leach Aid and the Blank were within experimental error. Additionally the results for the break times were also within experimental error. See Tables 3 and 4.

TABLE 4

Example 5 Results for EVD 91216 (i.e., MC1000) and the Blank

| | | EVD 91216 | Blank | delta (sec) |
|---|---|---|---|---|
| Pre QC test | Organic break | 168 | 89 | 79 |
| | Aqueous Break | 104 | 60 | 44 |
| Extraction | Organic break | 60 | 69 | −9 |
| | Aqueous Break | 176 | 133 | 43 |
| Strip | Organic break | 96 | 67 | 29 |
| | Aqueous Break | 130 | 129 | 1 |

Example 6

About 1 L of organic solution was prepared with LIX984N and LIX860N-I (manufactured and sold by BASF) at a ratio of about 50:50 (v/v) at about 10 v/v % in Shellsol™ D70 manufactured by Shell Chemical LP. This organic solution was twice contacted with a QC electrolyte at a ratio of about 1:1 (v/v) and about 500 ml of the resulting solution was then filtered through No. 1 PS paper to serve as an experimental control. The remaining about 500 ml of the organic solution was contacted with a QC electrolyte containing about 500 ppm of the MC1000 leaching aid. A standard reagent QC test was then conducted for the two resulting organic solutions. The organic solution that was contacted with the leaching aid was clay treated at a concentration of about 1 wt/v % and contacted with a synthetic QC feed (about 250 ml organic solution with about 250 ml aqueous solution) and the clay treated organic solution continuous break time was recorded.

TABLE 5

Example 6 Results

| | Leach Aid | Blank |
|---|---|---|
| Organic break | 104 (C.T. 10 sec) | 52 |
| Aqueous Break | 117 | 120 |

TABLE 5-continued

Example 6 Results

|  | Leach Aid | Blank |
|---|---|---|
| SO | 0.917 | 0.896 |
| E30 | 4.022 | 4.65 |
| E300 | 4.849 | 4.887 |
| S30 | 1.063 | 1.08 |
| S300 | 1.051 | 1.074 |
| E300 Fe | 0.0031 | 0.0024 |
| E30 kinetics | 82.9% | 95.2% |
| S30 kinetics | 98.9% | 99.4% |
| Cu/Fe | 1564 | 2036 |

Examples 5 and 6 showed that in the event of a significant overdose of the leaching aid, there could be a slight increase in phase disengagement and decrease in extraction kinetics which would be easily treatable by clay treatment ("C.T.").

Example 7

To test effectiveness of the leaching aid on total copper recovery and the recovery rate of copper, a blank leaching solution and a leaching solution containing the MC1000 leaching aid were prepared. For the blank, a carboy was filled with DI water to about the 20 L mark and about 202 g of concentrated sulfuric acid was added and mixed thoroughly. For the leaching aid solution, a carboy was filled with DI water to about the 20 L mark and about 202 g of concentrated sulfuric acid and 2 g of leaching aid were added and mixed thoroughly.

Figure 7:
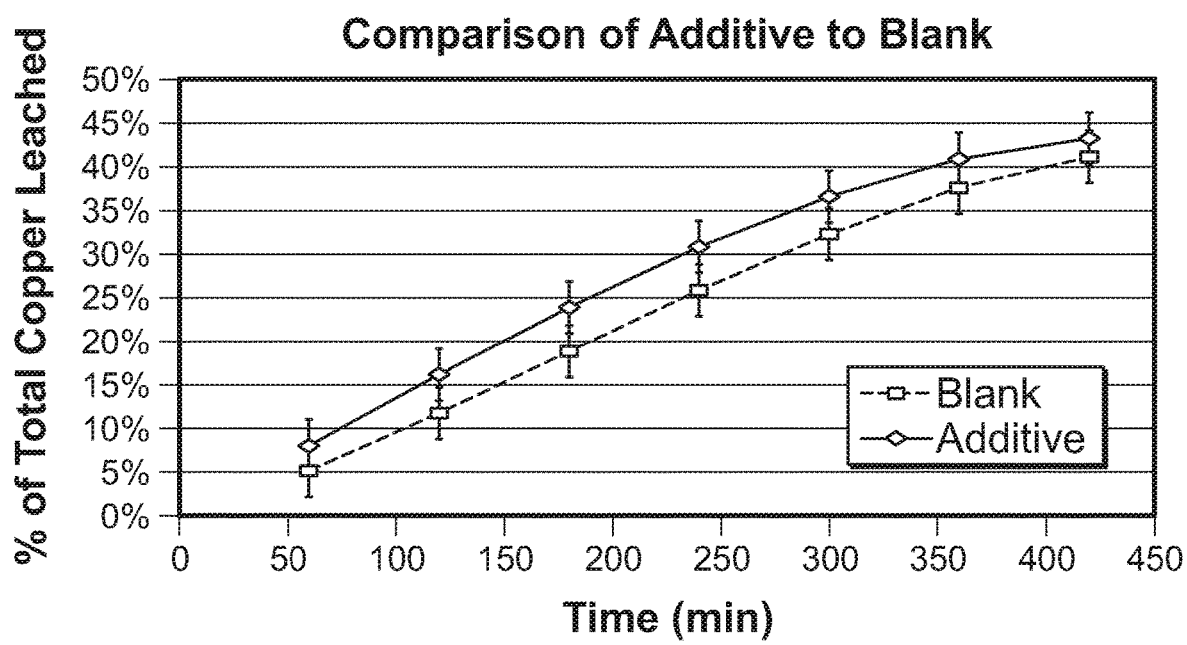
FIG. 7 is a chart showing results for Example 7 that compares the percent of total copper leached (%) per minute for a leaching aid and a control.

Small glass columns were attached to a suitable support using two chain clamps. A metering pump was used to transfer the leaching solutions from the carboys into the leach columns at a desired rate. A wide mouth funnel was placed into the top of the column and one 1 kg test charge of copper ore was poured into each column. Erlenmeyer flasks (1 L) with weights recorded were placed under each column. When all columns were loaded, the leaching solution was pumped onto the ore. When solution began dripping out of the column, the start time was recorded. At intervals of about one hour, the Erlenmeyer flasks were removed and replaced with new flasks. The solutions were weighed and analyzed for copper content. FIG. 7 is a graph of an average of several column trials of a blank and a leaching aid.

Example 8

This experiment explored a method for selecting one or more leaching aids as additives to a leaching solution. The method approximates the results of 2 m (h)×20 cm (d) laboratory scale columns.

Using a plastic funnel to facilitate transfer, 1 kg test charges of copper ore which were ground to −10 mesh were slowly added to bench top glass columns fitted with a glass frit. Leaching solutions were prepared from deionized water and sulfuric acid to a concentration of 10 g/L (gpl). Acid only was added to the control solutions whereas solutions containing a leaching aid were prepared in concentrations that ranged from about 25 ppm to about 200 ppm. Most candidates were screened at about 100 ppm initially, and further studies investigated a wider range of surfactants. Solutions were fed into leach columns dropwise; while a specific flow rate is not required for feasibility studies, pumps were adjusted to maintain similar flow rates. The PLS was sampled four to six times over the first several hours and then again at about 24 hours when the pumps were shut off; all samples were analyzed for copper content to develop leaching curves. The samples were analyzed by commonly known methods in the art using atomic absorption.

The results were compared to the control. Suitable leaching aids having a faster rate of copper recovery or an overall higher total copper recovery over the 24 hour period were selected. Several samples were analyzed and the averages and standard deviations were determined.

Figure 8:
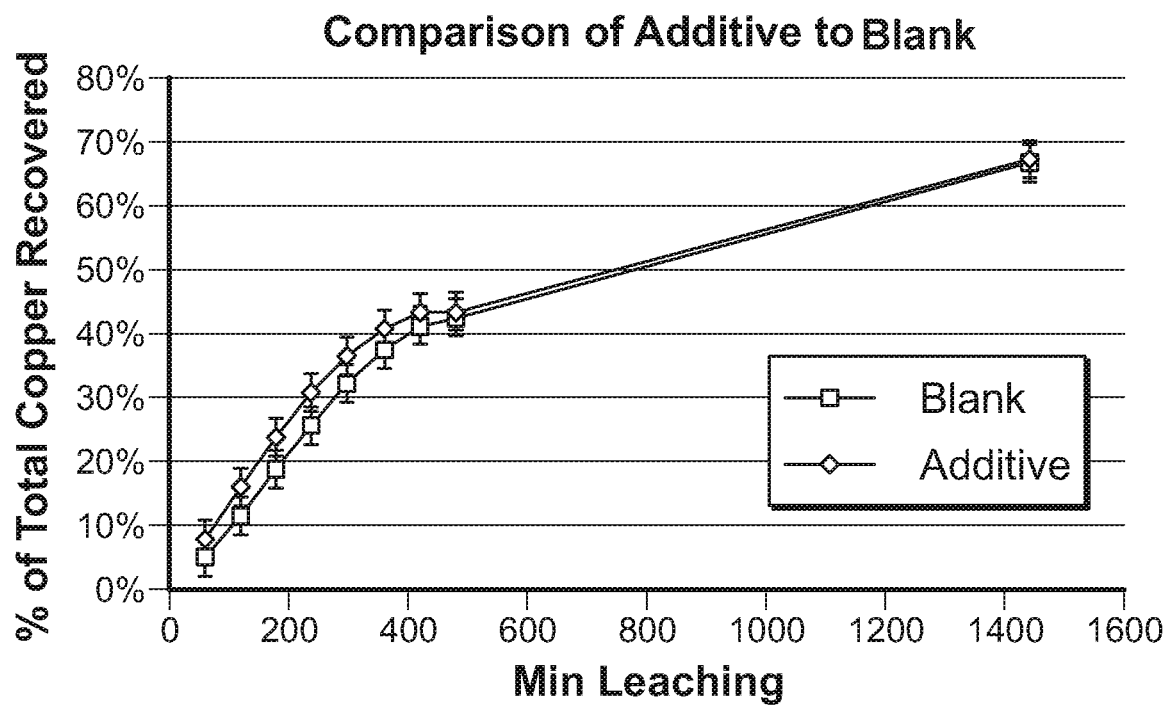
FIG. 8 is a chart showing results for Example 8 that compares the percent of total copper leached (%) per minute for a leaching aid and a control.

Almost 20 compounds were screened via this method, and well over 100 benchtop columns were run to determine dosing ranges. Other compounds were removed from testing after generating large quantities of stable foam or having a critical micelle concentration ("CMC") that was lower than the minimum required for this work (>500 ppm). The figure below is an example of data collected from feasibility studies for one promising candidate (MC1000). The data is most accurately interpreted when viewed as a qualitative indication of a leaching aid's ability to improve the rate of copper extraction or total copper recovery. Below is a graph of the effect of the MC1000 leaching aid on copper leaching. Each leaching curve shown in FIG. 8 represents the average of several column trials.

Results from this study indicate that certain compounds would likely perform well in long term, 2 m (h)×20 cm (d) laboratory column tests because the copper recovery initially and over time is greater than the control.

Example 9

While previous attempts were made to increase copper leaching efficiency through the use of leaching aids, the chemical species employed had a negative impact on downstream solvent extraction and electrowinning processes. One critical requirement of any leaching aid is compatibility with all downstream processes. To determine compatibility, standard quality control tests were performed and confirmed at current operating concentrations. Table 6 displays results of the compatibility test work.

TABLE 6

Results of quality control tests on MC1000 and TMP-7(EO).

| | TMP-7(EO) | MC1000 |
|---|---|---|
| Test | (structure shown) | (structure shown) |
| Phase Disengagement | Pass | Pass |

TABLE 6-continued

| | | |
|---|---|---|
| Kinetics Testing | Pass | Pass |
| Cu/Fe Selectivity | Pass | Pass |
| Circuit Testing | Pass | Pass |

The results of compatibility studies suggest that no negative impact on solvent extraction and electrowinning would be expected. While solution dynamics change as volumes increase, there were no ill effects observed.

Example 10

Two 60 day leaching trials were conducted in 2 m (h)×20 cm (d) lab scale columns (a total of 32 columns). Each column contained one test charge (200 lbs of ore) and was mixed, agglomerated with water and concentrated sulfuric acid, and loaded into the columns. Once columns were loaded, the ore was allowed to cure for 5-7 days before solution was percolated through the columns.

Figure 9A:
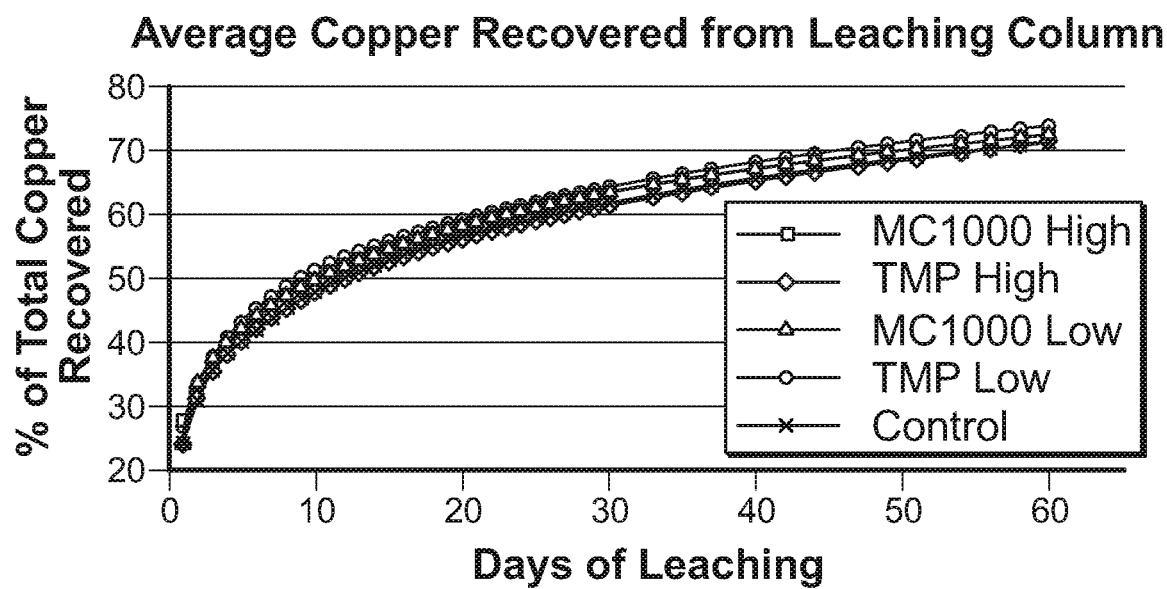
FIG. 9A is a chart showing results for Example 10 that compares percent of total copper recovered (%) per day for various leaching aids.
Figure 9B:
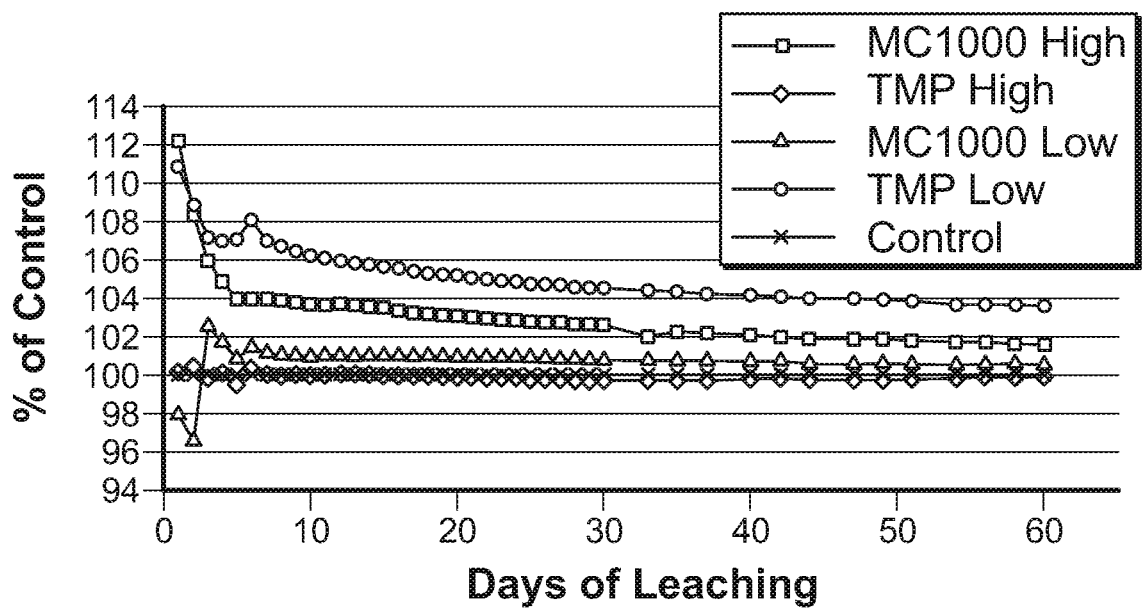
FIG. 9B is a chart showing results for Trial 1 in Example 10 that compares percent of control (%) per day for various leaching aids.
Figure 9C:
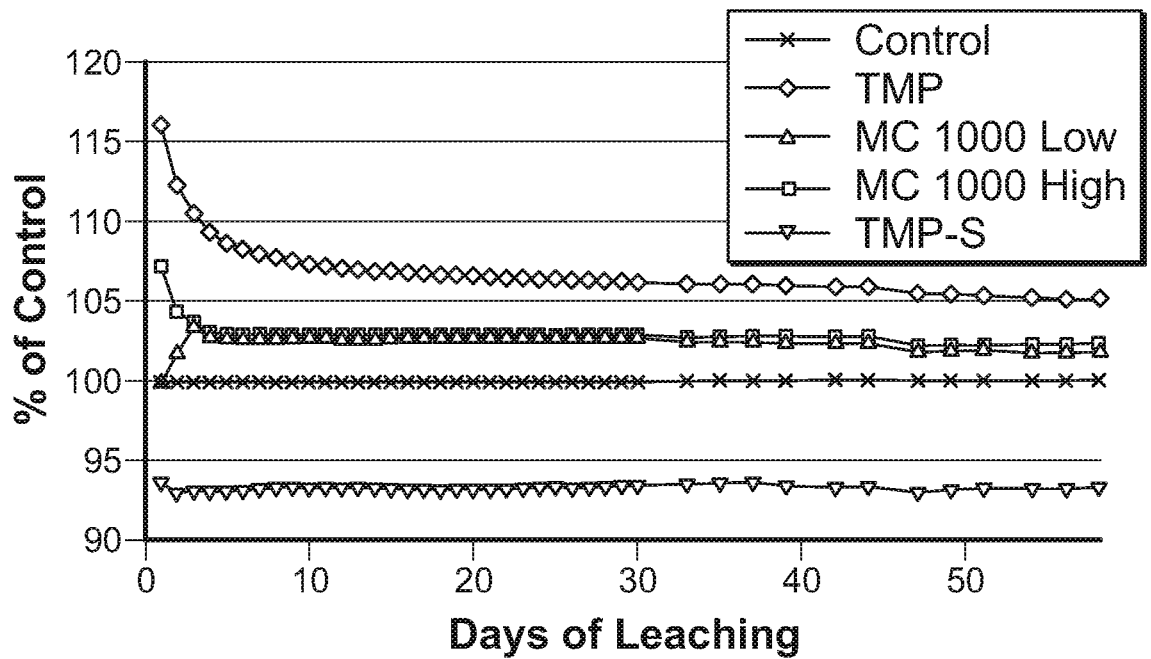
FIG. 9C is a chart showing results for Trial 2 in Example 10 that compares percent of control (%) per day for various leaching aids.

Each solution was prepared with tap water and sulfuric acid (10 gpl) and the leaching aid at the appropriate concentration. The leaching process was open cycle and the flow rates of percolating solution were set to 8 mL/min. The results of these trials are depicted in the leach curves below. After two months of leaching, the majority of the accessible copper was leached and the leach curves were approaching an asymptote as shown in FIGS. 9A to 9C. FIG. 9A shows leaching curves from the first trial. Both TMP-7(EO) and MC1000 were tested at 50 ppm (high) and 25 ppm (low) concentrations. Each was run in triplicate (control in quadruplicate). FIG. 9B shows a comparison of leaching results as a function of the control columns for Trial 1. FIG. 9C shows a comparison of total copper recovered as a function of the control columns for Trial 2. In Trial 2, MC1000 was tested at 50 and 100 ppm, TMP-7(EO) was tested at 25 ppm, and sulfated TMP-7(EO) at 50 ppm.

The trials indicate that TMP-7(EO) (25 ppm) is a suitably performing leaching aid. Not only does it increase the total copper recovery at the end of the leach cycle by greater than the minimum threshold of 3%, it also increases the rate of copper recovery. This effect is visible by the significant increase in leaching compared to the controls during the first 7-10 days of the leach cycle. MC1000 (50 ppm) also significantly improves leaching and is above the 3% threshold increase in copper recovery. Results for both compounds are reproducible throughout testing to date.

The invention claimed is:

1. A leaching solution for an ore, the leaching solution comprising:
 a lixiviant; and
 a leaching aid comprising one or more compound comprising formula (I):

$$R(AO)_nB)_m(AO)_nH)_p \quad (I)$$

wherein each AO group is, independently, an alkyleneoxy group selected from ethyleneoxy ("EO"), 1,2-propyleneoxy ("PO"), 1,2-butyleneoxy, and styryleneoxy;
 each n is independently an integer from 0 to 40;
 B is H;

R is a group selected from formula (II) to (VIII):

$$R_1C(CH_2O)_3 \quad (II)$$

wherein $R_1$ is H, methyl, ethyl, or propyl;

$$C(CH_2O)_4 \quad (III);$$

$$OC(CH_2O)_2 \quad (IV);$$

$$N(CH_2CH_2O) \quad (V)$$

$$(R_2)_xN(CH_2CH_2O)_y \quad (VI)$$

wherein $R_2$ is a $C_1$-$C_4$ alkyl, y is 1-3 and x+y=3;

$$O(CH_2)_rO \quad (VII),$$

wherein r is 2 to 6; and $$O(CH(CH_3)CH_2)O \quad (VIII); \text{ and}$$

wherein when R is formula (V) or formula (VI) when y is 1, m is 1, and p is 0,
 wherein when R is formula (IV), formula (VI) when y is 2, formula (VII) or formula (VIII), m is an integer from 1 to 2, and p is an integer such that the sum of m plus p equals 2,
 wherein when R is formula (II) or formula VI when y is 3, m is an integer from 1 to 3, and p is an integer such that the sum of m plus p equals 3, and
 wherein when R is formula (III), m is an integer from 1 to 4, and p is an integer such that the sum of m plus p equals 4;
 wherein the lixiviant is at a concentration of about 1 g/L to about 50 g/L of the leaching solution, and
 wherein the one or more compound is at a concentration of about 1 ppm (by weight) to about 2000 ppm (by weight) of the leaching solution.

2. The solution of claim 1, wherein the lixiviant comprises sulfuric acid.

3. The solution of claim 1, wherein the lixiviant is at a concentration of about about 1 g/L to about 25 g/L of the solution.

4. The solution of claim 1, wherein the one or more compound is at a total concentration of about 5 ppm (by weight) to about 50 ppm (by weight).

5. The solution of claim 1, wherein the one or more compound is at a total concentration of about 15 ppm (by weight) to about 30 ppm (by weight).

6. The solution of claim 1, wherein each n is independently 2 to 20.

7. The solution of claim 6, wherein each n is independently 2 to 10.

8. The solution of claim 1, further comprising a metal.

9. The solution of claim 8, wherein the metal is selected from the group consisting of copper, gold, silver, nickel, zinc, molybdenum, vanadium, uranium, and combinations thereof.

10. The solution of claim 1, wherein the one or more compound comprises the following structure:

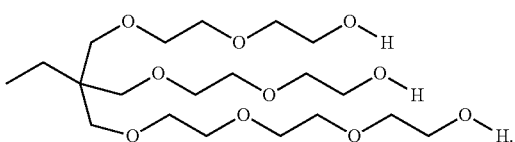

11. The solution of claim 10, wherein the one or more compound is at a total concentration of about 5 ppm (by weight) to about 50 ppm (by weight).

12. The solution of claim 10, wherein the one or more compound is at a total concentration of about 15 ppm (by weight) to about 30 ppm (by weight).

13. The solution of claim 10, wherein the one or more compound is at a total concentration of about 25 ppm (by weight).

14. A method of leaching a metal from an ore, the method comprising:
contacting the ore comprising the metal with the solution according to claim 1.

15. The method of claim 14, wherein contacting the ore comprises heap leaching or dump leaching.

16. The method of claim 14, wherein the metal is selected from the group consisting of copper, gold, silver, nickel, zinc, molybdenum, vanadium, uranium, and combinations thereof.

17. The method of claim 14, wherein the metal comprises copper.

18. The method of claim 14, wherein the ore is agglomerated.

19. The method of claim 14, wherein the ore is not agglomerated.

20. A method of recovering a metal from an ore, comprising:
contacting the ore comprising the metal with the solution according to claim 1 to form a pregnant leaching solution; and
recovering the metal from the pregnant leaching solution.

21. The method of claim 20, wherein recovering the metal comprises a solvent extraction process.

22. The method of claim 21, wherein the compound in the solution is compatible with the solvent extraction process.

23. The method of claim 20, wherein recovering the metal comprises an electrowinning process.

24. The method of claim 23, wherein the compound in the solution is compatible with the electrowinning process.

25. The method of claim 20, wherein the metal is selected from a group consisting of copper, gold, silver, nickel, zinc, molybdenum, vanadium, uranium, and combinations thereof.

26. The method of claim 25, wherein the metal is copper.

* * * * *